US010933699B2

(12) United States Patent
Howland

(10) Patent No.: US 10,933,699 B2
(45) Date of Patent: Mar. 2, 2021

(54) LIGHT WEIGHT HEAT-SEALED TIRE

(71) Applicant: Warwick Mills Inc., New Ipswich, NH (US)

(72) Inventor: Charles A Howland, Temple, NH (US)

(73) Assignee: Warwick Mills, Inc., New Ipswich, NH (US)

(*) Notice: Subject to any disclaimer, the term of this patent is extended or adjusted under 35 U.S.C. 154(b) by 0 days.

(21) Appl. No.: 16/096,788

(22) PCT Filed: Apr. 27, 2017

(86) PCT No.: PCT/US2017/029787
§ 371 (c)(1),
(2) Date: Oct. 26, 2018

(87) PCT Pub. No.: WO2017/189817
PCT Pub. Date: Nov. 2, 2017

(65) Prior Publication Data
US 2019/0241024 A1 Aug. 8, 2019

Related U.S. Application Data

(60) Provisional application No. 62/328,954, filed on Apr. 28, 2016.

(51) Int. Cl.
*B60C 9/04* (2006.01)
*B60C 9/14* (2006.01)
(Continued)

(52) U.S. Cl.
CPC ...... *B60C 15/0072* (2013.01); *B60C 15/0009* (2013.01); *B60C 15/0036* (2013.01);
(Continued)

(58) Field of Classification Search
CPC .............................. B60C 2009/0269
See application file for complete search history.

(56) References Cited

U.S. PATENT DOCUMENTS 4,273,177 A * 6/1981 Nybakken ............... B29D 30/08
152/209.5
4,649,979 A * 3/1987 Kazusa ..................... B60C 9/20
152/525
(Continued)

FOREIGN PATENT DOCUMENTS

EP 2995706 A1 * 3/2016 ........... B60C 9/0042
JP 62133179 A * 6/1987
(Continued)

OTHER PUBLICATIONS

Machine Translation: EP-2995706-A1; Kramer Thomas; (Year: 2019).*
(Continued)

Primary Examiner — Kendra Ly
(74) Attorney, Agent, or Firm — Maine Cernota & Rardin

(57) ABSTRACT

A tire having reduced mass and low rolling resistance and a method of manufacture thereof achieves reduced weight by using thin layers of thermoplastic polyurethanes ("TPU's") to heat seal the carcass, breaker, and tread layers of the tire to each other, rather than embedding the layers in conventional, relatively thicker and heavier layers of sulfur cured vulcanized carbon filled elastomers. Creep and "springback" of the thermoplastic polyurethanes during cure is avoided by maintaining the adhered layers under pressure until the assembly cools below its glass transition temperature. In embodiments, the heat sealing can be performed on the forming drum, and in some embodiments cool rollers are applied to the heat-sealed carcass so as to accelerate the cooling to below the glass transition temperature.

22 Claims, 21 Drawing Sheets

(51) Int. Cl.
*B60C 15/00* (2006.01)
*B60C 5/14* (2006.01)
*B60C 9/02* (2006.01)
*B60C 9/20* (2006.01)

(52) U.S. Cl.
CPC *B60C 2005/147* (2013.01); *B60C 2009/0269* (2013.01); *B60C 2009/0408* (2013.01); *B60C 2009/0475* (2013.01); *B60C 2009/2064* (2013.01)

(56) References Cited

U.S. PATENT DOCUMENTS

| | | | | |
|---|---|---|---|---|
| 4,810,317 | A * | 3/1989 | Lang | B29D 30/42 |
| | | | | 152/548 |
| 5,047,110 | A * | 9/1991 | Bryant | B29D 30/72 |
| | | | | 152/524 |
| 6,740,280 | B1 * | 5/2004 | Brown | B29D 30/0601 |
| | | | | 264/315 |
| 2007/0131333 | A1 | 6/2007 | Neubauer et al. | |
| 2009/0283194 | A1 * | 11/2009 | Hashimoto | B29D 30/70 |
| | | | | 152/527 |
| 2010/0000650 | A1 * | 1/2010 | Matthiesen | B60C 1/0016 |
| | | | | 152/525 |
| 2011/0061783 | A1 | 3/2011 | Itoh et al. | |
| 2012/0152428 | A1 * | 6/2012 | Kouno | B29D 30/1628 |
| | | | | 152/526 |
| 2012/0298275 | A1 * | 11/2012 | Miyazaki | C08K 5/375 |
| | | | | 152/525 |
| 2013/0312883 | A1 * | 11/2013 | Yang | B60C 13/002 |
| | | | | 152/187 |
| 2013/0316181 | A1 * | 11/2013 | Kouno | B29D 30/72 |
| | | | | 428/423.3 |

FOREIGN PATENT DOCUMENTS

| | | | |
|---|---|---|---|
| JP | 07314576 A | * | 12/1995 |
| JP | 07314576 A | | 12/1995 |
| JP | 2009083537 A | * | 4/2009 |
| WO | 9717216 A1 | | 5/1997 |
| WO | 0129299 A2 | | 4/2001 |
| WO | 0218158 A2 | | 3/2002 |

OTHER PUBLICATIONS

Machine Translation: JP-07314576-A; Ochi, Takaaki; (Year: 2020).*
Machine Translation: JP-2009083537-A; Igarashi, Yasuo; (Year: 2020).*
Machine Translation: JP62133179A;Teikoku Sangyo; (Year: 2020).*
International Search Report & Written Opinion for Appl PCT/US2017/029787 dated Jun. 22, 2017, 5 pages.

* cited by examiner

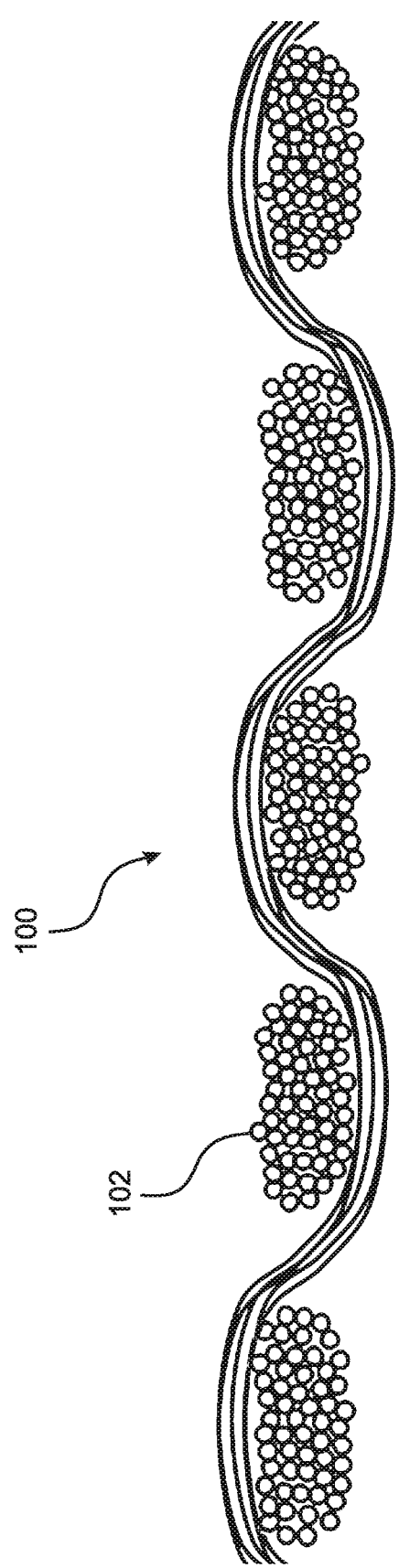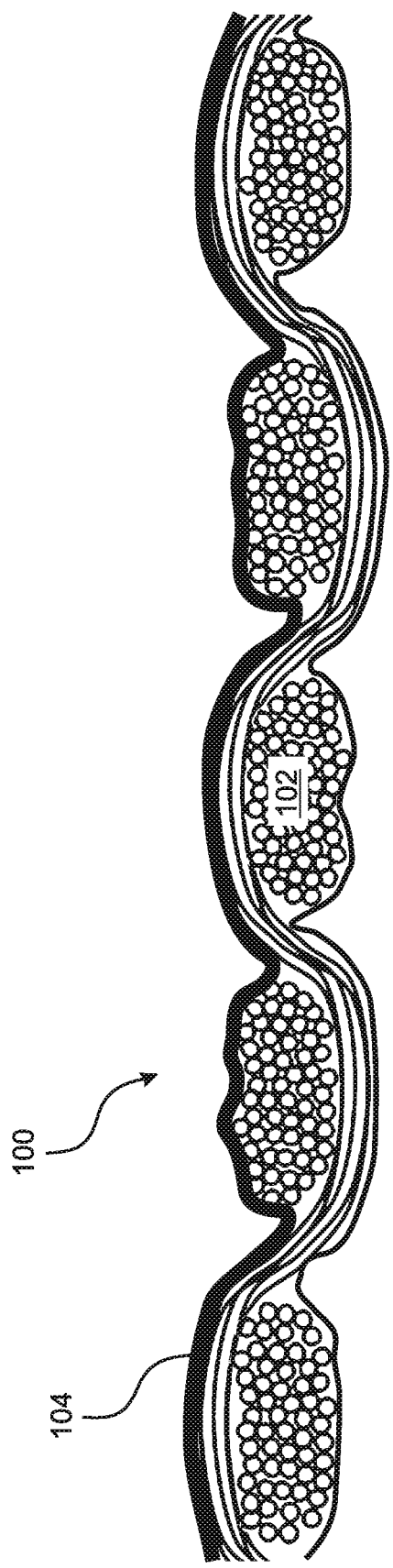

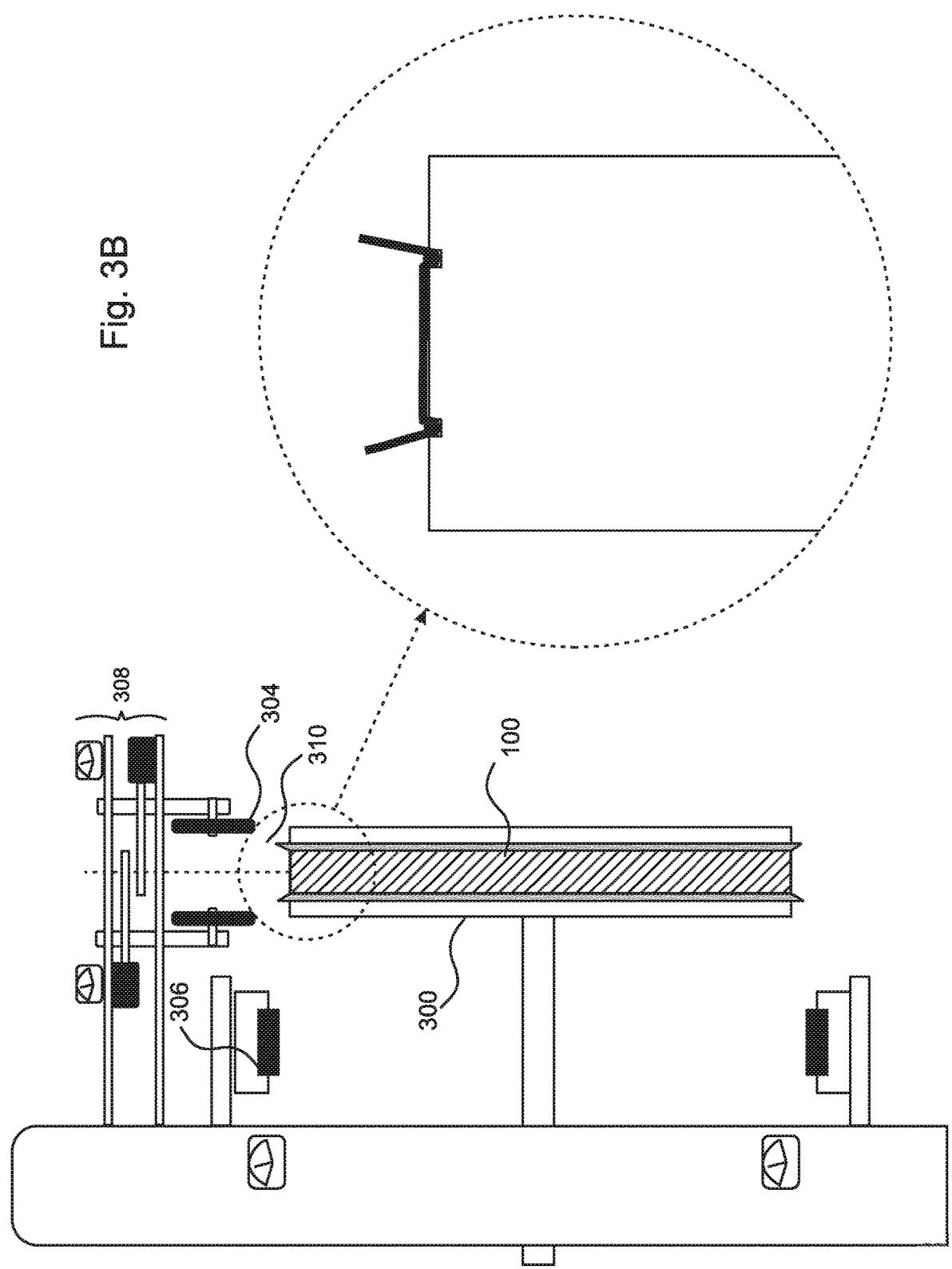

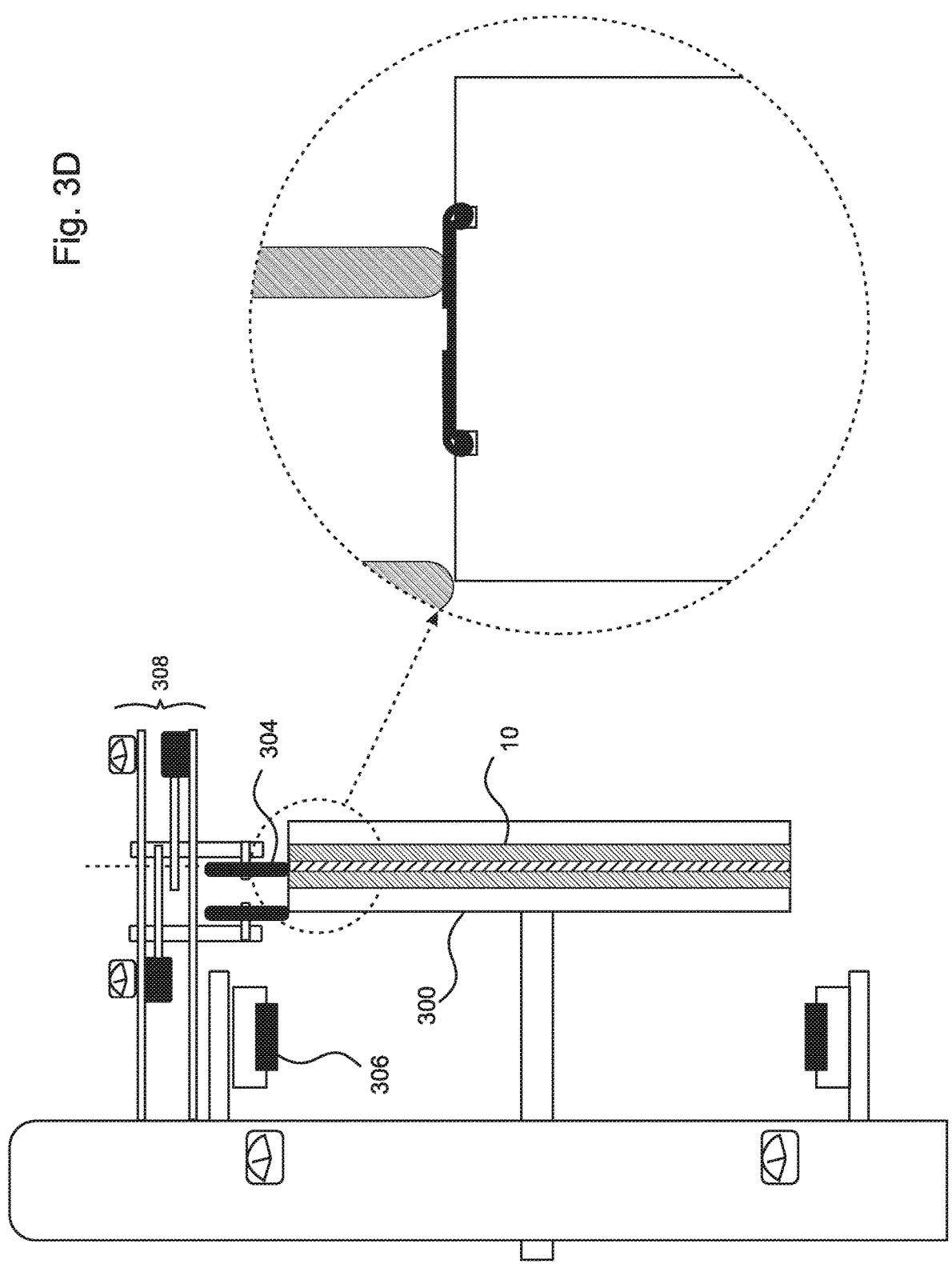

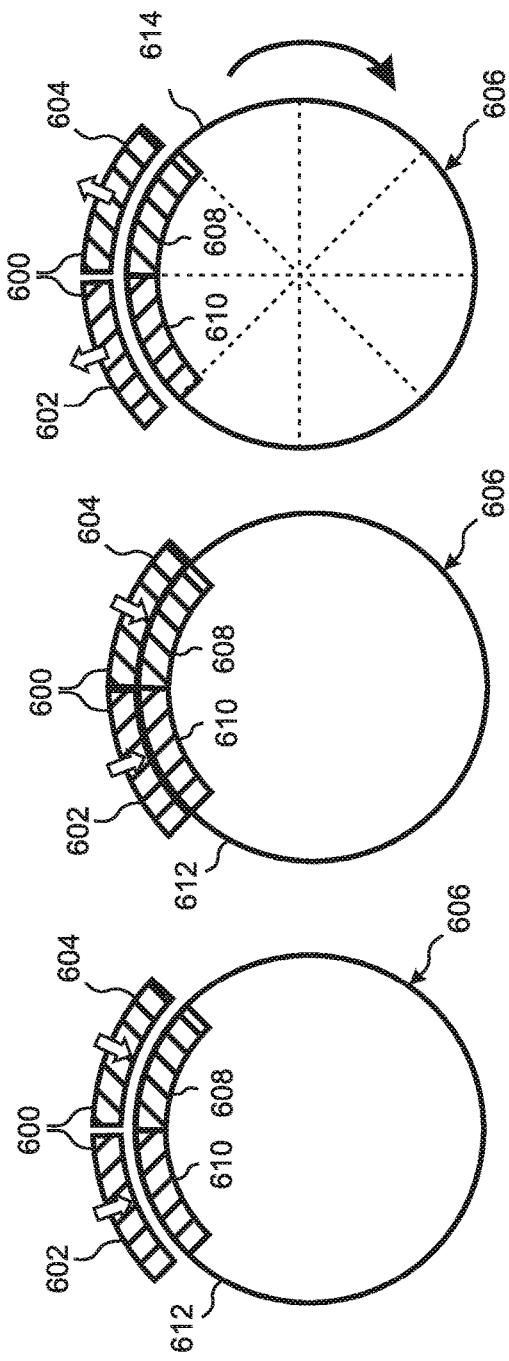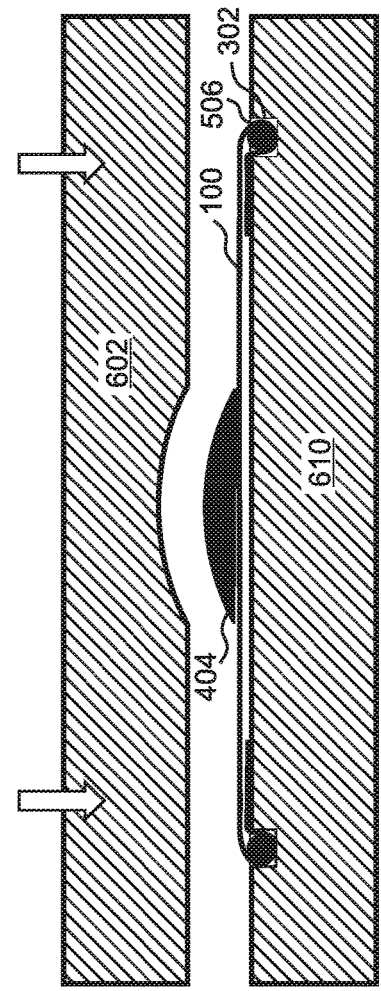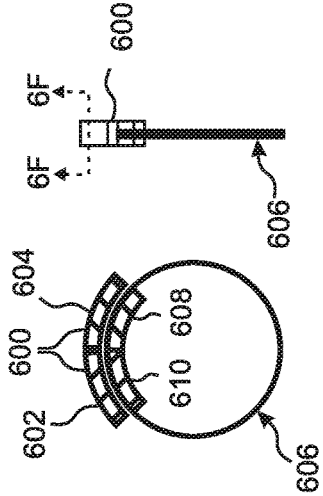
Fig. 6A
Fig. 6B
Fig. 6C
Fig. 6D   Fig. 6E
Fig. 6F

LIGHT WEIGHT HEAT-SEALED TIRE

FIELD OF THE INVENTION

The invention relates to vehicle tires, and more particularly, to lightweight tires suitable for small vehicles.

RELATED APPLICATIONS

This application is a national phase application of PCT application PCT/US2017/029787, filed on Apr. 17, 2010. PCT application PCT/US2017/029787 claims the benefit of U.S. Provisional Application No. 62/328,954, filed Apr. 28, 2016. Both of these applications are herein incorporated by reference in their entirety for all purposes.

BACKGROUND OF THE INVENTION

A primary requirement for small vehicles is to conserve power as much as possible. This is particularly true of self-powered vehicles such as bicycles, E-bikes, and wheel chairs. The wheels and tires of these vehicles consume energy in two ways. First through rolling resistance, and second due to acceleration and deceleration of the rotating mass of the wheels and tires. Since the mass of the tire is of primary importance to both of these energy consuming effects, it is important to minimize the mass of a small vehicle tire as much as possible, with bicycle tires being the most extreme example.

Small vehicle tires are generally constructed from 2 primary materials, namely textiles and elastomers. When constructing a conventional tire for a bicycle or other small, self-powered vehicle, the first step is to manufacture a "carcass," which will underlie the tread and will form the bead and side walls of the eventual tire. Typically, a coating of an elastomer mixed with sulfur and carbon black is applied to a textile, which is then cut into a long strip of textile sheet. The coated sheet is wound around a radially expandable "building drum," and the ends of the strip are joined together by a simple splice or overlap so as to form a continuous band around the drum.

Parallel wire or yarn cords (referred to sometimes herein as 'bead cores" or simply as "cores") are wrapped around the drum on top of the carcass band and above bead grooves provided in the building drum. The drum is then radially expanded, so as to embed the cores into the soft carcass band, after which the edges of the carcass are folded over the cores so that the cores are located at the edges of the carcass and encapsulated within the folds of the textile sheet. These rounded sides of the carcass comprising cores surrounded by folded textile are referred to herein as the "beads" of the carcass. For some tire designs, before the carcass is folded the cores are offset from the edges of the carcass band by at least 25% of the band width, so that the folded edges of the carcass strip meet or overlap in the center, resulting in a carcass that has a thickness equal to at least twice the thickness of the coated textile carcass sheet. This is sometimes referred to as a "French" folding design.

Once the carcass has been formed on the forming drum, in some tire designs one or more layers of penetration and impact resistant textile, collectively referred to as the "breaker," are applied to the central region of the carcass. The breaker performs a penetration and impact protective function that is similar to the steel belts that are often included in automobile and truck tires, but with lower weight.

Finally, a thick band of a tread elastomer, typically mixed with sulfur, carbon black, and/or silica, is applied on top of the breaker and carcass. At this point, the tire, which is flat and flexible, is removed from the forming drum and placed within the outer rim or shell of a toroidal pressure mold, where the tire is heated and pressed outward by an inflatable bladder into the shell, which shapes the tire into the familiar U-shaped cross section, and also forms the tread pattern in the tread elastomer. As the tire is heated under pressure within the mold, the elastomer coatings applied to the carcass are merged with the tread elastomer, with the breaker being encapsulated in between. The heat and pressure eventually cause the elastomer to be vulcanized, i.e. cured, so that once the final assembly is removed from the mold it maintains its shape and takes on the required physical properties of the finished tire.

All of these bonds and joints must have sufficiently high adhesive bond strength to support the required tire performance. It should be noted that the textiles in the tire provide the majority of the tensile strength, while the elastomer provides:

adhesion, and the associated shear and tensile strength;
abrasion resistance;
cut resistance;
thermal and creep resistance under load; and
traction.

The basic structure and method of manufacture for small vehicle tires as described above have remained essentially unchanged since the early twentieth century, although the specific properties of the textiles, the elastomer formulations, details regarding the beads, etc., as well as the tread designs continue to evolve as new materials become available and tire designs are optimized for various specific applications.

While this classic approach to tire construction is well proven, it is notable that a large fraction of the total mass of the tire arises from the weight of the applied elastomers, even though the textiles in the tire provide the majority of the tensile strength and penetration resistance. Unfortunately, no practical solution has been proposed in the prior art that would significantly reduce the elastomer mass below current levels.

What is needed, therefore, is a tire suitable for use on small vehicles that is reduced in mass and minimizes rolling resistance, while maintaining substantially the same or better performance characteristics as tires that embody current technology.

SUMMARY OF THE INVENTION

A tire is disclosed having reduced mass and low rolling resistance as compared to existing tires used for similar applications, while maintaining the same or better performance characteristics as the existing tires. A method of manufacture of the disclosed tire, and an apparatus for manufacture thereof are also disclosed. Embodiments are suitable for use on bicycles, wheel-chairs, and other self-powered vehicles, as well as motorized vehicles such as motor scooters and motorcycles.

It will be understood that the emphasis placed herein on tires for small, self-powered vehicles, as well as some lightly powered vehicles such as mopeds and scooters, is not due to any fundamental limitation of the invention, but instead arises from the heightened importance of reduced tire weight in such applications, as compared to the relatively greater requirement for strength, durability, and temperature resistance, and relatively lower sensitivity to weight, of tires used for large, high-speed, motorized vehicles.

The present invention achieves reduced weight by improving the physical performance characteristics of the included textiles, and by using thin, lightweight layers of thermoplastic adhesives such as thermoplastic polyurethanes ("TPU's") to heat-seal the carcass, breaker (if included), and tread layers of the tire to each other, rather than embedding the layers in conventional, relatively thicker and heavier layers of sulfur cured vulcanized, carbon filled elastomers. The disclosed method of manufacture incorporates and requires thermal bonding of thermoplastic elastomers, in contrast to conventional methods that only require heat-curing of materials that are soft and moldable before being cured.

It should be noted that, unless the context requires otherwise, the terms "TPU", "urethane" and "polyurethane" are used generically throughout this disclosure to refer to thermoplastic materials of all formulations, i.e. all materials that are inelastically deformable and/or flow when heated above a glass transition temperature, and cease to be inelastically deformable or flow when cooled below the glass transition temperature. Similarly, the term "TPU bonding" is used generically to refer to any bonding by a thermoplastic material.

Embodiments of the disclosed method of manufacture include at least two TPU bonding cycles, whereby the folded sides of the carcass textile are bonded to the underlying carcass textile in a carcass bonding cycle, and a tread assembly is bonded to the carcass in a tread bonding cycle. Some embodiments further include a splice bonding cycle, whereby the ends of a strip of the carcass textile are bonded together to form a carcass textile band by a thermal TPU bonding process.

During each TPU thermal bonding step, creep and "spring-back" of the thermoplastic polyurethanes is avoided by maintaining the TPU-adhered layers under pressure until the assembly cools below its glass transition temperature. In embodiments, at least some of the TPU thermal bonding steps can be performed on the forming drum, and in some embodiments, cooling heads and/or rollers are applied to the heat-sealed carcass and/or to the assembled tread and carcass so as to maintain pressure and accelerate the cooling to below the glass transition temperature.

In embodiments, the textiles used in the carcass and breaker (if included) layers include flattened, untwisted yarns that provide a high cover factor, thereby increasing the penetration resistance of the fabric and decreasing weight by reducing absorption of thermoplastic polyurethane into the interstitial spaces between the yarns.

Coating Methods

In embodiments of the present invention, there are at least 4 critical adhesive joints that must be formed during the basic tire assembly.

splicing tape-to-carcass joints formed when joining the ends of the strip of carcass textile together on the forming drum to form the carcass textile band;

carcass to carcass joints formed when folding the edges of the carcass textile over the wire or yarn bead cores to form the tire bead;

a joint that bonds the puncture and cut resistant breaker textile to the carcass (in embodiments where a breaker layer is included); and a joint that bonds the tread elastomer to the breaker (if included) and carcass layers.

In similar embodiments, the tread elastomer is molded or otherwise formed in a separate step, and in some embodiments is combined with breaker and/or chafing layers of textile, after which the prepared tread assembly is TPU bonded to the carcass either on the forming drum or on a separate apparatus.

All of the joints included in the tire manufacture must all have high strength adhesive bonds so as to provide the required tire performance. The present invention forms at least some of these high strength bonds using heat-sealed thermoplastic polyurethanes, i.e. TPU bonds, instead of thick, sulfur cured elastomer layers. In embodiments, this substitution of TPU thermal bonds in lieu of cured sulfur elastomers results in a reduction of between 15% and 50% in the mass out of the tire, as compared to conventional small vehicle tires having similar applications, performance characteristics, and size.

Carcass Design Features

According to the present invention, the carcass textile must have adequate tensile strength, impact resistance, thermal performance, and compatibility with coatings and urethane elastomers. In embodiments, the fabric yarns used in the carcass textile are flat in aspect and closely spaced, so as to provide a high cover factor that avoids increased weight that would otherwise arise from large interstitial spaces which would need to be filled with elastomer.

The fiber geometry of the carcass textile or textiles must have low rolling resistance and good mechanical resistance to cut and abrasion. In embodiments, the lightweight, heat-sealed tire sidewalls of the present invention, which are formed by the carcass, include substantially less elastomer than conventional sulfur cured tire constructions. In some embodiments, the thermoplastic coatings are less than approximately 0.05 mm thick. While such coatings protect the sidewalls to some degree, nevertheless, in comparison with conventional tires, greater reliance for protection from hazards is placed by the present invention on the carcass textile itself, which must have good intrinsic abrasion and cut resistance. To this end, embodiments incorporate large abrasion yarns and/or cut resistant yarns of liquid crystal polymer (LCP) or Para-aramid into the carcass textile. Some embodiments use a balanced weave, whereby performance yarns are also used as cross-body yarns, while in other embodiments an asymmetric construction is used whereby the cross body yarns are of relatively lower performance. When the various fibers of the textile do not match each other in modulus, for example when yarns combine both filament and staple fibers, embodiments use yarn engineering with staple fibers and high twist to increase the stretch of the filament-based yarns.

Transitional Priming of Textile Layers

The heat-sealed surfaces of textiles used in embodiments of the present invention have a shore A hardness of 50-100. However, the textile fibers can be many times as stiff as the elastomers to which they are bonded. Accordingly, so as to achieve good bond strength, the coatings in various embodiments include transitional priming layers between elastomer and textile layers, whereby the priming layers are harder than the adjacent elastomer layers but softer than the adjacent textile layers, so that the priming layers serve as modulus step-down layers that compensate for the modulus mismatch between the fiber layers and the elastomer layers. In some of these embodiments, this priming is achieved using isocyanate epoxy primers, coatings of Resorcinol Formaldehyde Latex ("RFL"), and/or isocyanate elastomer blends. The use of low molecular weight polyols blended with long chain elastomers and isocyanate can also be useful for forming these transitional, modulus step-down layers that intermediate between the fiber layers and the elastomer layers.

TPU Coatings

The application of thin, conformal, thermoplastic polyurethane coatings onto the textile layers of the present invention can be accomplished by solvent methods, or by the lamination of extruded or blow films to the primed textile.

As has already been noted, in the prior art the bonds to the carcass textile (including the splice, bead turn-up, breaker, and tread bonds as enumerated above) are formed by encapsulation of the textile in a thick layer of sulfur cure elastomer, thereby forming sulfur cure to sulfur cure elastomeric bonds. In contrast, according to the present invention, these bonds are formed by TPU bonding using just enough thermoplastic polyurethane elastomer to fill the inter-fiber spaces within the carcass textile, and to provide interfacial contact between the flattened surfaces of the carcass, breaker, and tread textiles during the heat-sealing process.

In embodiments, the coatings applied to the carcass textile render the carcass assembly impermeable to air, so that the tire is operable at its specified inflation pressure without an inner tube, thereby eliminating the weight that would otherwise be added to the vehicle by inner tubes.

Tread Elastomer

In addition to being thin, so as to minimize mass, the thermoplastic tread elastomer must be selected to have enough heat resistance to avoid joint creep and flow under operating loads and temperatures. In embodiments, the dual character of urethane hard segments and soft segments is used to provide a novel solution to this thermal problem.

Embodiments of the present invention include one or more of polyurethane, thermoplastic vulcanizate (TPV), solution styrene butadiene rubber (SBBR), and hybrid silica/SBBR in the tread assembly.

Method of Manufacture

Also disclosed herein is a novel method for processing the disclosed components into a finished tire. Unlike the sulfur cure elastomers that are used to form the required joints in conventional tires, the much thinner coatings of thermoplastic polyurethane used to form the joints in the present invention are not molded or cured. Instead, the joints are formed by heat sealing, which requires several novel steps.

Splicing

The splicing joints that join the ends of the strip of carcass textile in some embodiments to form the carcass textile band are formed by TPU bonding the carcass textile to itself in an overlapping region, where the ends of the strip of carcass textile meet on the forming drum. However, this approach results in a doubling of the carcass textile thickness in the splice region, and, if the inflated shape of the tire carcass is affected by the spice, the tire may have a perceptible vibration that is unacceptable to users. Accordingly, in other embodiments an engineered splicing tape is used to form the carcass splicing joints. The splicing tape must be thin and strong, such that it exceeds the tensile strength of the carcass textile in a direction perpendicular to the splice line, while making almost no contribution to the modulus of the textile in the direction parallel to the splice line.

As noted above, in embodiments all of the thin, heat-sealed TPU joints included in the present invention are formed while sufficient heat and pressure are applied to maintain a desired physical configuration of the carcass or tire assembly while allowing the TPU to flow into the spaces between the textile fibers. Furthermore, after the TPU has been heated and has flowed, embodiments continue to apply a pressure that is sufficient to maintain the compressed configuration of the joint during the cooldown process.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 1A is a cross sectional view of a carcass textile layer in an embodiment of the present invention;

FIG. 1B is a cross sectional view of the textile layer of FIG. 1A with a layer of TPU applied thereto;

FIG. 3B is a side view of the apparatus of FIG. 3A shown with a carcass mounted on the building or heat seal drum, shown with bead cores applied to the carcass textile, causing edges of the carcass textile to lift upward away from the drum, together with a cross section through the carcass and the building drum showing the bead cores and the carcass textile in the process of forming the turn-up beads;

FIG. 3D is a side view of the apparatus of FIG. 3C shown after a second heated roller has traversed the left side of the carcass textile band and bonded or pre-bonded a second folded edge of the carcass textile to the underlying region of the carcass textile;

FIGS. 6A through 6D are cross sectional side views of a building machine used to build a tire assembly on a flattened carcass in an embodiment of the present invention, whereby the building machine sequentially applies heating and cooling to successive segments of the tire assembly as the tire assembly is manually rotated through the machine;

FIG. 6E is a front view of the embodiment of FIGS. 6A through 6D, showing a cross section location for FIG. 6F;

FIG. 6F is an enlarged cross-sectional view of the bond head of the embodiment of FIGS. 6A through 6D, taken at the location indicated in FIG. 6E.

DETAILED DESCRIPTION

Carcass Textile Design

Figure 1C:
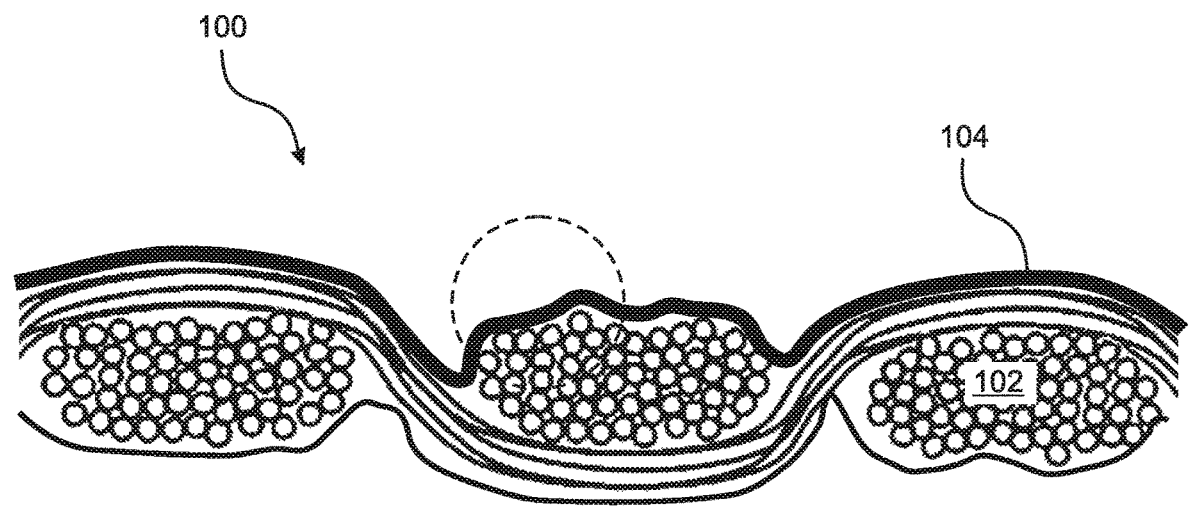
FIG. 1C is a close-up view of a portion of FIG. 1B.

According to the present invention, the fiber included in the disclosed tire provides the majority of the structural strength and protection from hazards. So as to minimize the weight of the tire, embodiments incorporate the strongest fibers available that can provide the required properties.

Following is a list of fibers that are used in various embodiments, along with some comments regarding their relevant properties:

1. High tenacity nylon fibers of approximately 6-8 grams per denier (gpd).
   Nylon can provide excellent tensile performance and high elongation.
   Nylon 66 is easy to process and has high levels of OH surface functionality, resulting in good fundamental adhesive characteristics.
   The maximum coating, lamination and heat seal temperature that is compatible with nylon is approximately 400° F.
   Nylon has the lowest modulus of the fiber alternatives discussed herein, resulting in excellent impact resistance.
   Nylon has perhaps the best abrasion resistance of all the fibers considered herein, but offers only moderate cut resistance.
2. High tenacity PET Polyester fibers of approximately 6-7.5 gpd
   PET is easy to process and low in cost
   PET fiber has low surface functionality and requires special priming to support good adhesion to the TPU layers of the invention.
   The maximum coating, lamination and heat seal temperature that is compatible with PET is approximately 430° F.
   PET has a higher modulus than nylon.
   PET has lower abrasion resistance than nylon, with moderate cut resistance.
3. Liquid Crystal Polymer ("LCP") Vectran fibers of approximately 23-27 gpd
   LCP is difficult to process
   LCP has good tensile conversion and low fibrillation
   Similar to non-aromatic polyester fiber, LCP has low surface functionality and requires special priming to support good adhesion to the TPU layers of the invention.
   The maximum coating, lamination and heat seal temperature that is compatible with LCP is approximately 500° F.
   LCP has a modulus that is very similar to para aramid, namely 3% elongation at break.
   LCP fibers of 5 denier per fiber (dpf) have very good abrasion resistance and the highest cut resistance of all the fiber options discussed herein.
4. Para Aramid Kevlar and Twaron fibers at approximately 23-27 gpd
   Para-aramid has good tensile conversion and low fibrillation
   Like nylon, the surface of para aramid has high functionality and good adhesion.
   The maximum coating, lamination and heat seal temperature that is compatible with para aramid is approximately 500° F.
   The modulus of para aramid is 3% elongation at break.
   Para aramid fibers of 2.5 dpf have poor abrasion but good cut resistance.

Requirements for the carcass textile design in embodiments of the present invention are summarized in the following paragraphs.

Adequate Tensile Strength and Impact Resistance:

The tensile forces applied to a tire are determined by the tire diameter and the design tire pressure. The tensile conversion of the carcass yarn is dependent on the bias angle of the yarn, which is the angle between the yarn direction and the radius of the tire and the construction of the woven textile. Note that the term "radius" is used herein to refer to the direction of travel of the tire, in agreement with the usage of the term in the art.

Figure 2A:
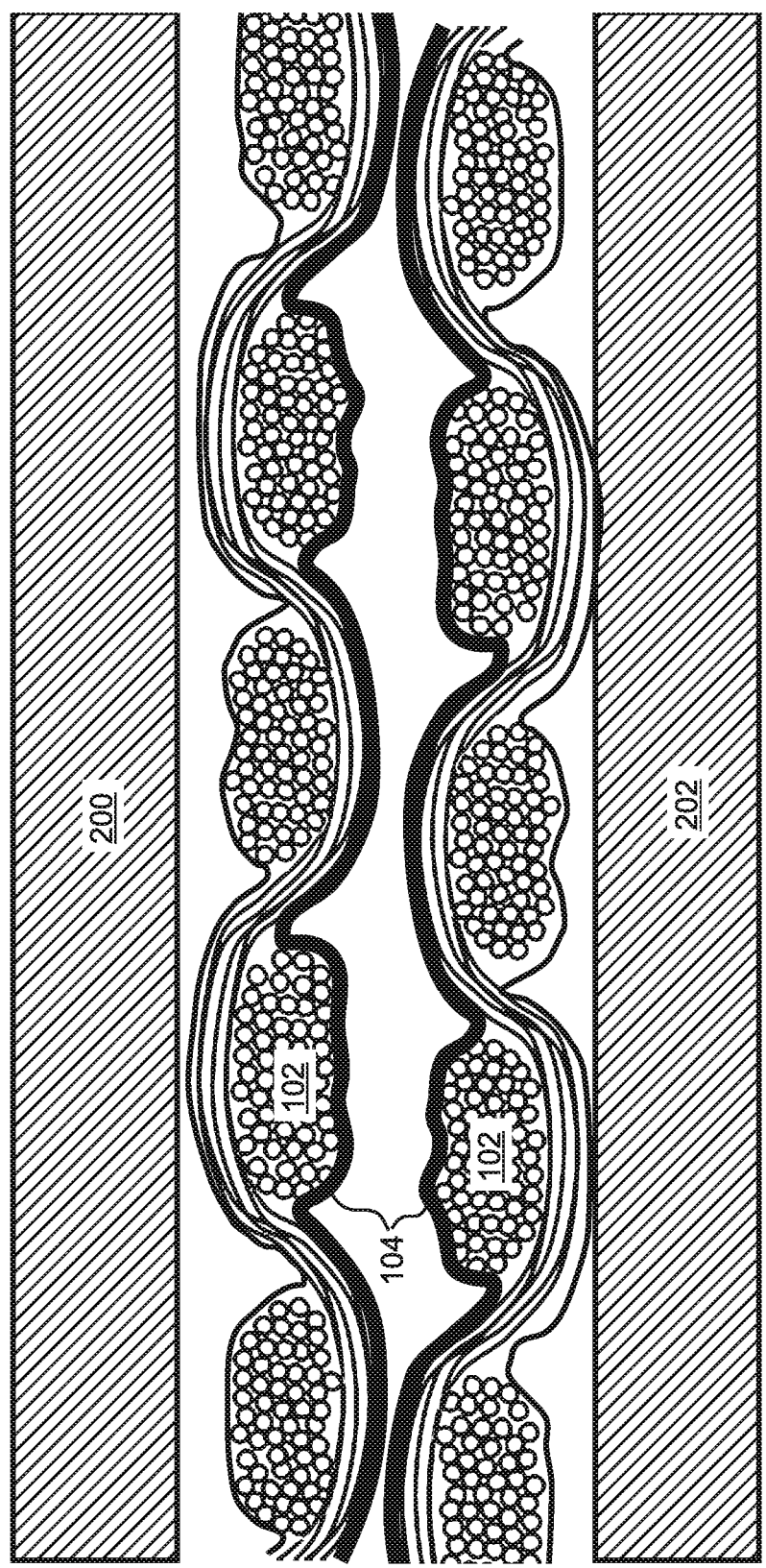
FIG. 2A is a cross-sectional view of a turn-up region of a carcass in an embodiment of the invention where two layers of the carcass textile are sandwiched between heat seal bond heads
Figure 2B:
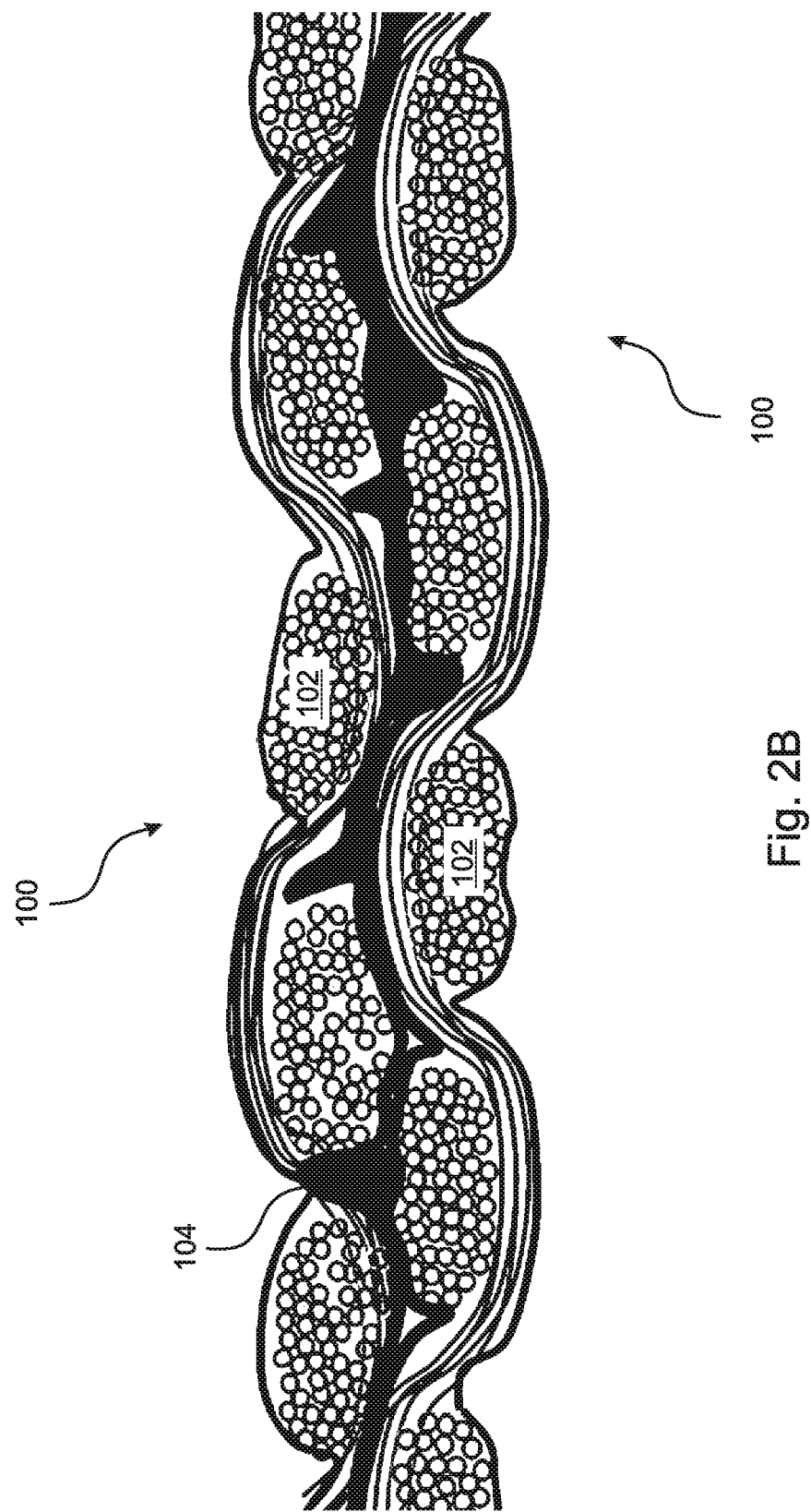
FIG. 2B is a cross-sectional view of the turn-up region of FIG. 2A after the heat seal between the layers has been formed and cooled.
Figure 2C:
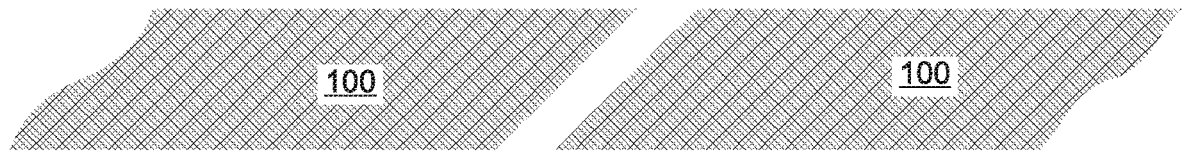
FIGS. 2C through 2E are top views that illustrate a sequence of steps used to splice together the ends of a strip of carcass textile.

In some embodiments where the carcass yarns are at a 45 degree bias, as shown in FIG. 2C, a design factor of 1.6 times the working pressure is applied to the over-hoop stresses in the carcass. The impact requirements are generally met by this design factor in embodiments even without the load and impact spreading effect of a conventional thick sulfur cure elastomer.

Thermal Performance:

The thermal requirements that are applicable to embodiments of the invention are determined by the dual requirements of compatibility with the processing temperatures of the primers and coatings, and with the processing temperatures and heat seal temperatures of the polyurethane elastomers. In most cases, the heat seal temperatures are the limiting requirements.

Fabric Morphology:

With reference to FIGS. 1A through 1D, in embodiments the fabric and yarns 102 of the carcass 100 are flat in aspect so as to avoid large interstitial spaces that would otherwise need to be filled with elastomer 104. The fiber geometry has a low rolling resistance and good mechanical resistance to cut and abrasion. The lightweight heat sealed tire sidewalls in embodiments of the present invention include substantially less elastomer than conventional sulfur cure tire constructions.

Abrasion and Cut Resistance:

In the tire sidewall and summit of a conventional small vehicle tire, the elastomer works together with the textile to resist abrasion, punctures, and cuts from road hazards. Conventional lightweight tires have a sidewall elastomeric thickness of between 0.2 and 0.5 mm. This relatively thick elastomer layer provides significant protection to the tire carcass fabrics, rendering them much less vulnerable to abrasion, cut and snag.

In contrast, according to the present invention, the TPU coating 104 (which in embodiments can be less than 0.05 mm thick) protects the sidewall to a much lesser degree, thereby requiring the carcass textile 102 to have proportionally higher intrinsic abrasion and cut resistance. Similarly, the TPU coating 104 of the carcass textile in the present invention provides less protection to the carcass from so-called "snakebite" punctures against the rim, as compared to conventional sulfur cured elastomer coatings, thereby requiring the carcass textile 102 to have proportionally higher intrinsic snakebite resistance.

Embodiments of the present invention include "localized," i.e. non-uniform application of coatings to the carcass textile. With respect to the cut and abrasion resistance, embodiments incorporate higher durometer urethane that is greater than 60 shore A. In some embodiments, ribs or bands of a higher thickness coating that is 2 or 3 times as thick as the baseline elastomer thickness are included. Some of these embodiments further incorporate ceramic grain into these thicker bands of coating. Aluminum oxide, silicon carbide, and garnet grain of between 600 and 50 grit are all effective in the elastomeric matrix for increasing cut and abrasion resistance. The mixing of ceramic grain with the coating bands can limit the use of extruded or blown films, such that in various embodiments the coatings that include ceramic grain in an elastomeric matrix must be pre-cast into films from a solvent cement or directly applied to the tire sidewall.

In embodiments, large abrasion resistant yarns are included in the carcass textile. In some of these embodiments the larger yarns are woven into the carcass textile, and in some of these embodiments the larger yarns are of the same fiber type as the base carcass yarns, but are larger, for example two times the denier, while in other embodiments the larger yarns are ten times the denier of the baseline carcass yarns. The large yarns can be included in a symmetric weave, whereby they are included in both the warp and fill directions, or in an asymmetric weave whereby only smaller fiber yarns are used in the cross-body direction. In various embodiments, the spacing of these large abrasion yarns is less than five per cm, and in some embodiments the spacing is less than three per cm.

Certain embodiments include high modulus, high cut yarns. The challenge is that very high cut yarns are not compatible, from a modulus perspective, with the polyester and nylon yarns used in embodiments of the carcass textile. In order to use these high modulus yarns to compensate for the reduction in tire mass, yarn engineering is used in some embodiments to match the modulus of yarn bundles containing high modulus fibers to the modulus of other yarns having only lower modulus fibers. For example, when there are modulus differences between the various fibers in the carcass textile, embodiments use yarn engineering with yarns made from short staple fibers and high twist level yarns that may exceed normal twist multiples for a normal staple yarn to reduce the effective modulus. Yarn wrapping with a low modulus core is also used in various embodiments. These wrapped or core-spun yarns increase stretch of low stretch fiber by putting the low stretch fibers at an angle of 80 to 90 degrees to the yarn axis.

Carcass Configurations in Various Embodiments

Various embodiments of the present invention include carcass features that can be grouped into at least two "families" of embodiments according to whether the carcass textile has a balanced weave or an unbalanced weave.

The first of these families of embodiments includes a short turn-up and a balanced woven carcass textile. In this family of embodiments, the carcass textile is at least partially single ply. The turn-up (i.e. the folding of the edges of the carcass textile over the bead cores) does not extend to the top of the summit, as in a "French" form. This family of embodiments has light weight and low rolling resistance as a result of the short turn-up, as well as reduced elastomeric deflection in the sidewall. In some embodiments of this family of embodiments, the tires have a carcass yarn alignment to the tire radial direction (i.e. a bias) of 45°, as shown in FIG. 2C.

In some very lightweight embodiments, the TPU elastomer is applied asymmetrically to the textile, such that it is thicker in the region that forms the turn-up bond. In some of these embodiments the turn-up is made to the outside of the tire, with care being paid to the heat seal treatment of the end of the 2 ply zone. This configuration puts the thicker coating layer of the turn-up region on the outside of the tire. In other embodiments, the turn-up is made to the inside of the tire, such that the step-off at the end of the turn-up must be feathered by the heat seal tooling so as to prevent formation of a step or edge that could be abrasive to an inner tube. This configuration has the advantage of keeping the turn-up under compression by the inner tube. In these embodiments, careful attention must be paid to the protection of the sidewall due to its limited coating thickness.

In the second family of embodiments, the carcass textile is of a full or semi-cord construction, having a lower denier, and in some cases fewer yarns per cm, in one direction as compared to the other. The tires in some of these embodiments have a full length turn-ups with French wrap, such that the edges of the carcass textile meet and/or overlap at the crown when folded over the bead cores. For these embodiments, the turn-up can be inside the tire, so that the turn-up is compressed by the inner tube, or outside the tire to improve balance and riding characteristics.

For sidewall durability, embodiments in both of these families of carcass configuration are combined with:
  Various lengths of turn-up, some of which cause the 2 ply overlap region to extend to the equator (French form)
  Bands of increased TPU thickness for abrasion resistance, and to prevent impact punctures against the rim (snakebites)
  Ceramic-filled TPU bands for abrasion and snakebite resistance
  Cut resistant yarns included in the carcass textile for abrasion resistance Splice Textile Design As noted above, in some embodiments the splice that joins the ends of the carcass textile strip is implemented using a layer of splicing tape to overlap the ends of the carcass textile strip. The thickness and bidirectional modulus of the splicing tape textile in these embodiments is very important to the shape of the tire, and the consistent shape of the tire with controlled axial and radial runout is very important to the user. For smaller, higher pressure tires, the allowable "runout," i.e. variation in tire radius, is typically about plus or minus 0.4 mm, with a maximum Total Indicator Reading (TIR) of 0.8 over the full tire rotation. The thickness of the splicing tape textile can consume a significant part of this runout tolerance. In embodiments, the tensile of the spicing textile is between 105% and 120% of the tensile of the carcass textile. So, for high pressure tires of greater than 5 bar inflation pressure the tensile requirements of the tire demand a minimum fiber denier of greater than 100 denier, and typically about 200 denier. The yarn bundle diameter in the coated splice textile defines the minimum splice material thickness. Embodiments include a splice material of less than 0.4 mm thickness, and in some of these embodiments the splice material thickness is less than 0.2 mm.

In embodiments, splice tape is applied to the underside of the carcass textile, facing the rim. In some embodiments, the splice is single-sided, with splicing tape applied only on the inside of the carcass textile. In other embodiments, splicing tape is applied to both the inside and the outside of the carcass textile.

The conditions of the heat seal process for applying the splicing tape are driven in part by the runout tire shape demand. While pressures for the hot and cold cycles of the heat seal process can run as low as 10 psi in some embodiments, the carcass splice process for smaller, higher pressure tires require higher rather than lower heat seal pressures, which can be up to 350 psi. Higher pressures applied during the heat seal process lead to thinner finished splices. The ratio of the splice material thickness to the carcass textile thickness as they are combined before and after bonding are important criteria for carcass assembly. In embodiments, these ratios are between 90% and 70%.

Breaker Textile Design

Embodiments include Vectran yarns in a breaker layer for cut and puncture resistance. A wide range of breaker textiles are suitable for these light weight tires. As a matter of consistency, for many embodiments lightweight breakers are more appropriate to maintaining a low total system mass. The use of high performance fibers such as liquid crystal polymer LCP (Vectran) or Para Aramid (Twaron) is consistent with this goal of low system mass and high performance. Breaker textiles can be engineered to optimize:
  cut resistance;
  fine Puncture resistance; and
  blunt puncture and impact resistance.

The mix of yarn types, yarn denier, filament denier, and fabric density included in various embodiments is based on these target requirements.

Textile Scour and Printing

In embodiments, the scouring process applied to the textiles that are incorporated into the carcass and breaker layers is sufficiently complete to limit the residual spin finish and size to less than 0.3% of the fiber mass, as measured by the soxlet extraction ASTM process.

As discussed in more detail below, in some embodiments the TPU coatings applied to the carcass textile are not filled or pigmented. In some of these embodiments, desired coloring, branding and/or other visual indications and appearances are provided by applying dyes and/or dye printing to the carcass textile. In some of these embodiments, bright branding and other high visibility elements are printed on the carcass textile after the scour and either before or after priming of the fiber. Various embodiments use disperse dyes for PET, and/or various reactive or acid dyes for nylon fiber types.

Decorative aspects are also included in embodiments by adding a dye or other coloring agent to the TPU coating that is applied to the carcass textile, and/or by embossing an exterior, visible surface of the TPU coating that is applied to the carcass textile.

Textile Priming

Figure 1D:
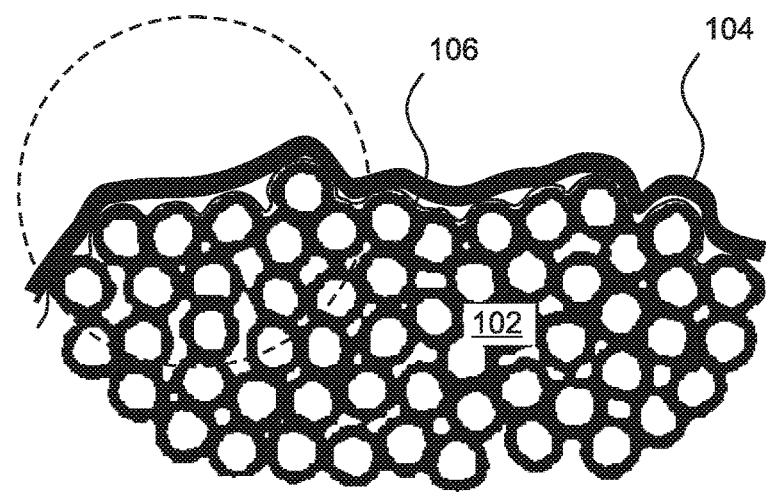
FIG. 1D is an even closer view of a portion of FIG. 1B.

With reference to FIGS. 1C and 1D, so as to achieve good bond strength, the coatings applied to the carcass textile and/or breaker in various embodiments include transitional priming layers 106 that are harder than the outer bonding elastomer 104, and that serve as modulus step-down layers that compensate for the modulus mismatch between the fiber layers 102 and the elastomer layers 104. These include high modulus coatings with higher isocyanate content and low modulus coatings and with little or no elastomer content. These coatings 106 are applied directly to the clean, scoured fiber 102.

An effective priming process should show adhesive failure of the textile surface after peel of sample bonds. When the failure surface of the textile is examined under a high powered microscope, it should show fiber damage and residual attached primer.

Textile Coating

In various embodiments the coating 104 applied to the carcass and/or breaker textile consists of one or more layers of elastomer and isocyanate. The better the elastomer properties are, the less elastomer is required to provide the required adhesion and associated tensile and shear strength. The polyester soft segment TPU grades not only provide the highest thermal and creep resistance, but also have bulk unfilled properties including about 5000 psi tensile at Shore A hardness of 80. These unfilled elastomer properties are significantly higher than the classic vulcanized styrene-butadiene rubber (SBR) or natural rubber (NR) materials, which have unfilled tensile strengths of 1000 to 1500 psi. In practice, these classic elastomers are never used unfilled, and with good reinforcing carbon blacks the tensile strengths can approach 4000 psi.

The novel coatings of the present invention have properties that are similar to the classic carbon-black filled elastomers, but without the need for carbon black filling. The polyester hard segment urethane grades provide thermal and mechanical stiffness that is more than equivalent to what the reinforcing carbon black contributes to the classic compounded elastomers.

One of the key benefits provided by embodiments of the present invention is the ability to provide the required mechanical and thermal adhesive performance while using only enough elastomer to fill the void space in the seal between the textile layers. This is a very surprising result, considering that in more than 100 years of tire production using classic elastomers such as NR and SBR the required elastomer loading has been many times this volume.

The reasons that the classic tire textile coating thickness is greater than 5 mils is related to both performance and processing options. In particular, the conventional, highly filled elastomers can only be solvent-coated or calendered. In general, the very thin layers that can be achieved with solvent coating do not provide adequate properties. This is in part because these solvent methods are limited in their coating technology, and only use a dip or saturation type process. The saturation or dip method puts coating over and into the entire textile, and does not allow controlled deposit of the coating to only the surface of the textile. Moreover, the solvent dipping method applies coating to both of the textiles faces, and tends to drive coating into the internal voids in the textile.

The calendering process that is classically used for deposit of elastomers filled with carbon black has many of the same issues as the solvent process regarding deposit control. The rheology of highly filled elastomers can make calendering a challenge, and this limits the options for deposit control. The minimum deposit is limited to perhaps 6 to 8 mils. The deposit control in the machine and cross machine directions for calendaring (frictioning) is limited to perhaps plus or minus two to four mils.

Knife, Kiss Roll, Gravure, Slot die coating methods

In addition to the use of high performance advanced urethane elastomers, the present invention makes use of advanced coating and lamination methods.

In addition to simple dip methods, the elastomers of the present invention can be applied by advanced, highly controllable methods such a knife kiss roll, Meyer rod, gravure, or slot die. These advanced coating processes can provide very tight mid coat and top coat deposit control. In addition, to one degree or another they allow the coating deposits to have controlled locations on the textile surface. In particular:

knife coating fills the low points in the textile and is not compatible with cord-type textiles;

kiss roll and gravure coats the high points of the textile and is semi conformal and thereby compatible with cord-type textiles; and slot die coating is fully conformal and compatible with cord-type textiles Film Extrusion Methods In contrast to classic elastomers, the urethane and TPU elastomers used in the present invention can be formed into films by slot die extrusion or by blown film extrusion methods. These films can be produced in thicknesses down to below 0.5 mils, and can be formed by various methods and laminated onto the carcass textile and/or other textile layers of the tire assembly to form topcoat layers on the textile system. By using advanced film manufacturing and laminating methods, very tight control of the coating film thickness and coating locations can be achieved. In particular, web deposit variations of as little as plus or minus 0.1 mil on 60" webs can be achieved.

The effectiveness of this invention in solving the tire mass problem is the result of this combined use of advanced materials and advanced processing methods.

In embodiments, the coatings applied to the carcass textile render the carcass assembly impermeable to air, so that the tire is operable at its specified inflation pressure without an inner tube, thereby eliminating the weight that would otherwise be added to the vehicle by inner tubes.

Bonded Heat Seal Configuration

With reference to FIGS. 2A and 2B, in embodiments a conformal heat seal process brings the fiber bundles into close alignment. FIG. 2A illustrates two layers of TPU-coated textile 102 located between a forming drum 202 and a heated ring 200 and ready for bonding. FIG. 2B shows the bonded layers of carcass textile after the heat seal. These figures are applicable for example to the formation of bonds in the 2-ply folded regions of the carcass after the edges of the carcass textile have been folded over the bead cores. Note the close nesting in FIG. 2B of the yarn bundles after bonding, and the minimal amount of TPU 104 that is required to fill the spaces between the flattened yarns 102 of the textile layers 100.

Creep resistance is a required attribute and is a characteristic that must be achieved by the invention. The multi-layer coating, coating thickness, and the on-drum heat seal process combine in various embodiments to provide both strength and creep resistance. In particular, the partial nesting of the yarns of the upper layer into the spaces between the yarns of the lower layer, as shown in FIG. 2B, helps to inhibit "creep" of the yarn layers relative to each other.

Carcass Splice Bonding

Figure 2D:
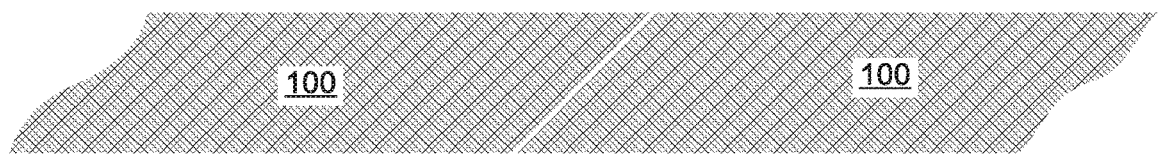

As noted above, it is necessary to splice the ends of the strip of carcass textile together so as to form a carcass textile band. In some embodiments, the ends of the strip of carcass textile are overlapped and bonded to each other. With reference to FIG. 2C, in other embodiments the ends of the strip of carcass textile 100 are aligned with each other, and as shown in FIG. 2D the ends are arranged in an adjacent but non-overlapping relationship. Note that in the embodiment of FIGS. 2C through 2G the ends of the strip of carcass textile 100 have been cut at a 45 degree angle.

Figure 2E:
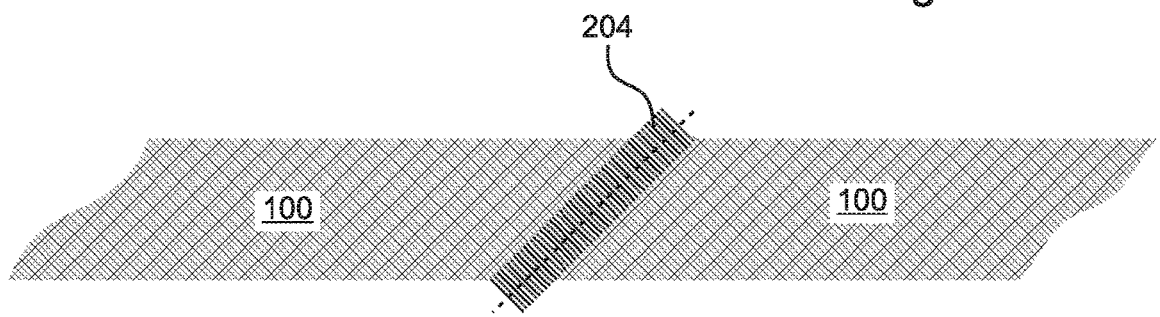

After the ends of the strip of carcass textile 100 are aligned and abutted, a layer of carcass splicing tape 204 is applied over the ends, as shown in FIG. 2E. In the embodiment of FIG. 2E, the splicing tape 204 is oriented such that the yarns in the tape run parallel and perpendicular to the splice line, which in this embodiment is biased at an angle of 45 degrees from the radius direction of the carcass textile band. In embodiments, the yarns of the splicing tape 204 that are perpendicular to the splice line are selected so as to provide a high tensile strength perpendicular to the splice line, which in embodiments is higher than the tensile strength of the carcass textile. In various embodiments, the splicing tape 204 has an asymmetric weave, whereby the yarns that are parallel to the splice line are selected so as to cause the splicing tape 204 to be relatively low in tensile and modulus in a direction parallel to the splice line and relatively higher in a direction that is perpendicular to the splice line.

Embodiments include a splice material of less than 0.4 mm thickness, and in some of these embodiments the splice material thickness is less than 0.2 mm. In embodiments, splice tape 204 is applied to the underside of the strip of carcass textile 100, facing the rim. In some embodiments, the splice is single-sided, with splice tape 204 applied only on the inside of the strip of carcass textile 100. In other embodiments, splice tape 204 is applied to both the inside and the outside of the strip of carcass textile 100.

Figure 2F:
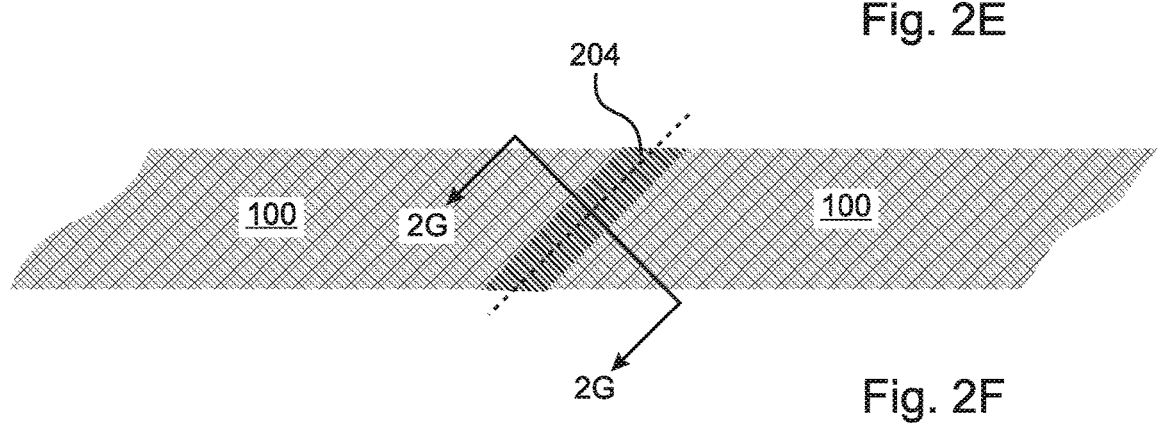
FIG. 2F is a cross sectional view through the splice of FIG. 2E.
Figure 2G:
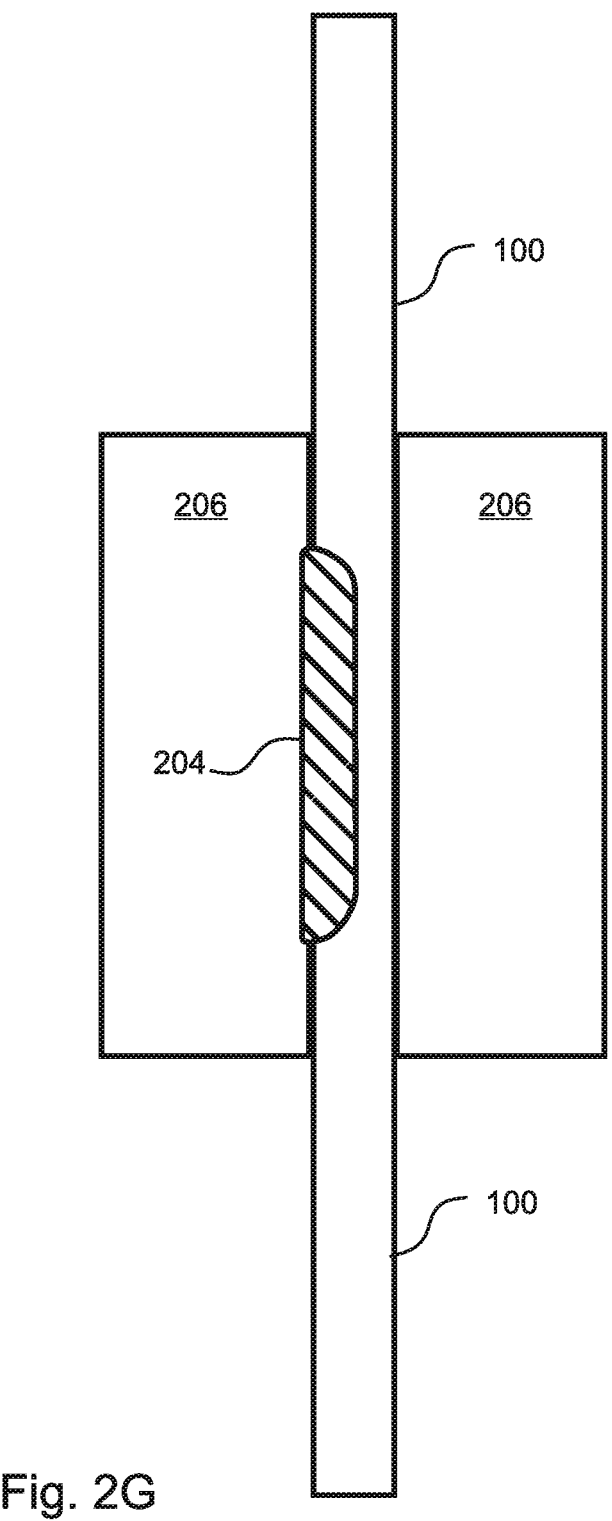
FIG. 2G is a side view that illustrates the application of heat and pressure to the top and bottom of the splice of FIG. 2F.

The splice tape 204 is then trimmed so that it extends fully and only over the strip of carcass textile 100, as shown in FIG. 2F, and heat and pressure are applied by bonding heads 206 applied to the top and bottom of the splice, as shown in FIG. 2G. In similar embodiments, a single bonding head is applied while the carcass textile is mounted on a building drum 300.

Bead Bonding Process and Apparatus

In embodiments, an apparatus used for manufacturing the carcass includes rollers that fold the edges of the carcass textile over the bead cores and provide heating under pressure to form a TPU bond or pre-bond between the folded sides of the carcass textile and the underlying carcass textile. The advantage of this process is that the required pressure can be applied locally to both sides of the carcass textile by the rollers. In embodiments, for each folded side of the carcass textile, the heat seal is formed by one of the rollers, and then, with proper adjustment of the drum speed and offset, the roller is allowed to cool and is able to maintain pressure while the bond cools, so as to form an effective, high density heat seal. In similar embodiments, a "pre-bond" is formed that is only required to maintain the folded sides of the carcass textile in position until a subsequent thermal bonding step can be applied. In yet other embodiments, a "tack" adhesive is applied, and is used to form the required pre-bond, which is then followed by a TPU bonding step.

Figure 3A:
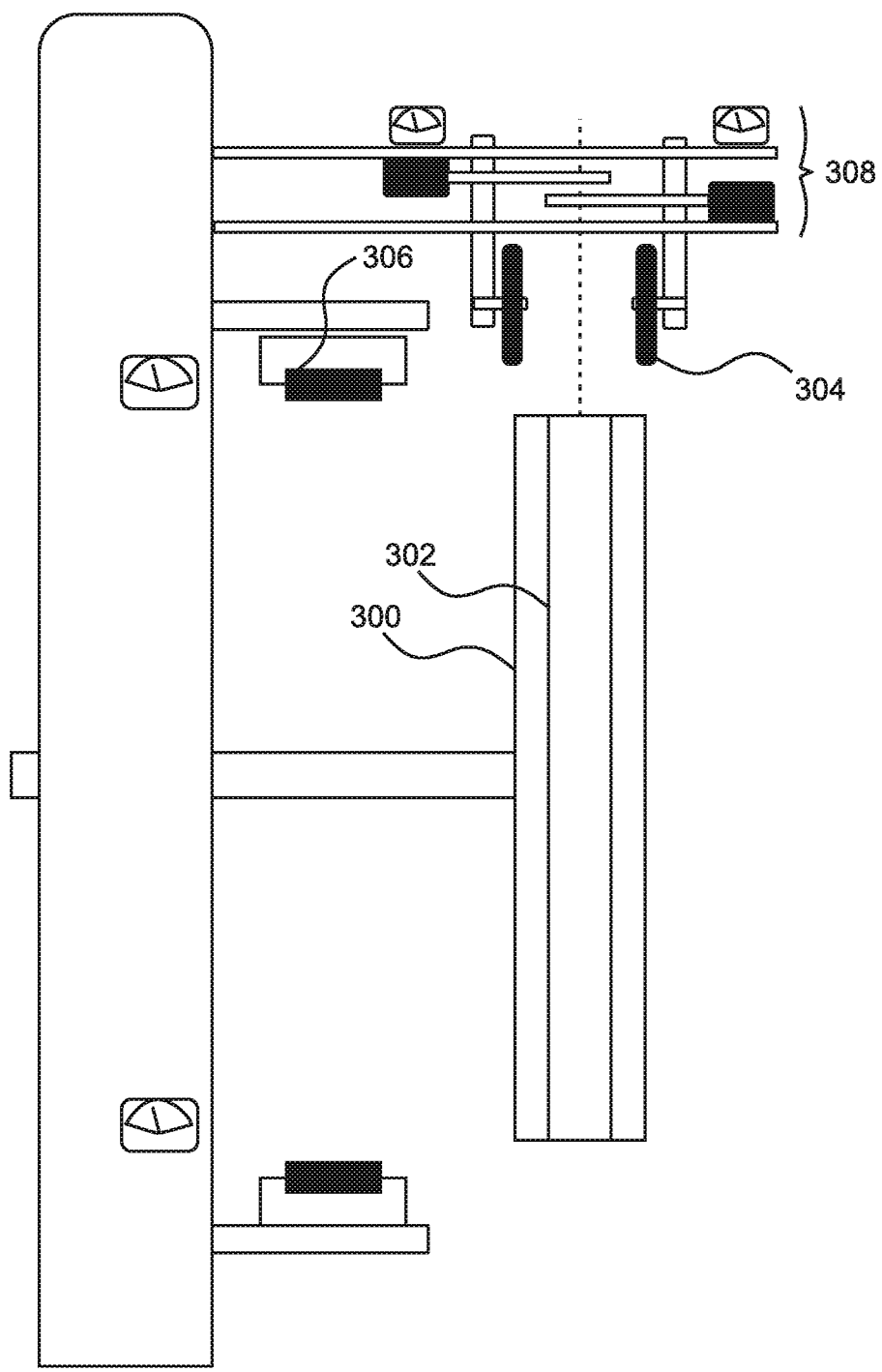
FIG. 3A is a side view of an apparatus that is able to form heat sealed TPU bead bonds and/or pre-bonds in an embodiment of the invention.

With reference to FIG. 3A, in embodiments an apparatus for forming the carcass turn-up heat seals or pre-bonds includes a radially expandable building drum 300 having bead grooves 302 formed therein. The apparatus further includes a roller assembly 308 that includes traversing carcass turn-up rollers 304, as well as a bond cooling ring assembly 306.

With reference to FIG. 3B, as a first step a strip of carcass textile 100 is mounted and spliced on the drum 300, and a coating of TPU is applied thereto. bead cores are then placed on top of the carcass textile above the bead grooves 302, and the drum is radially expanded so as to embed the bead cores into the carcass textile 100. This action also causes the sides 310 of the carcass textile 100 that are outside of the bead cores in the grooves 302 to be lifted upward off of the drum 300, as shown.

Figure 3C:
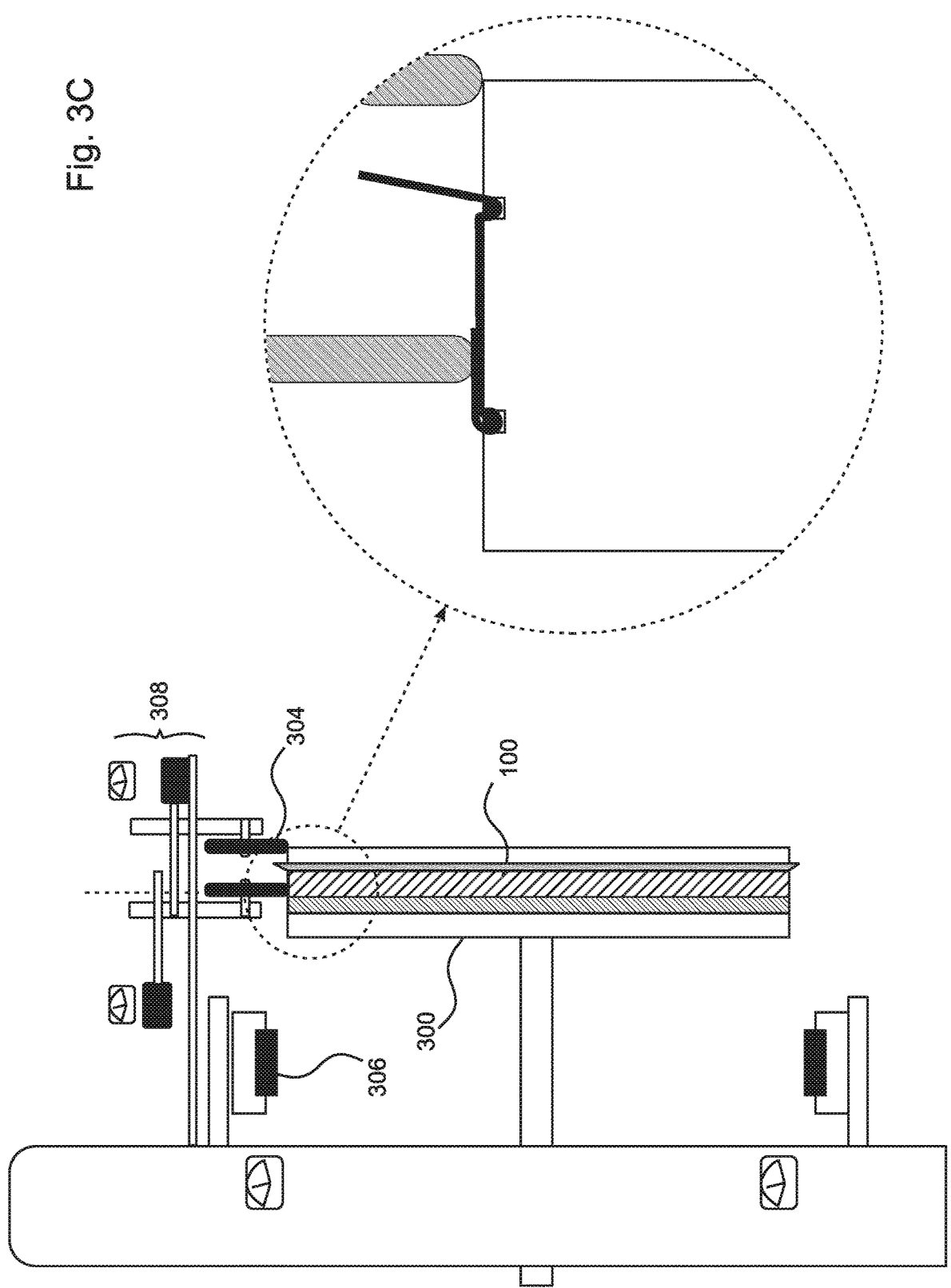
FIG. 3C is a side view of the apparatus of FIG. 3B shown after a first heated roller has traversed the left side of the carcass textile band and bonded or pre-bonded a first folded edge of the carcass textile to an underlying region of the carcass textile.

With reference to FIGS. 3C and 3D, while the drum 300 is turning, the roller assembly 308 is lowered, and the rollers 304 are advanced alternately from either side of the drum so as to fold down the sides 310 of the carcass textile and to form a heat seal between the overlapping layers of carcass textile 100 by applying heat and pressure thereto. In similar embodiments, the rollers 304 are used for tacking of the sides of the carcass textile 310 in place after folding them over the bead cores, and the ring assembly 306 is subsequently used to apply heat and pressure to form the TPU bond. In addition to the TPU bonding or pre-bonding method shown in FIGS. 3A-3D, the turn-up can be formed in a number of other ways, depending on the embodiment, so long as the bonded configuration has the required elastomer distribution, tensile, and creep resistance. For example, in lieu of the hot and cold roll-down shown in FIGS. 3A-3D, solvent elastomeric cement with tackifiers and isocyanate can be applied together with mechanical or pneumatic turn-up.

Tacking is a standard method that is used during assembly of conventional tires that include callendered and/or extruded, uncured sulfur rubber sections. Rubbers of this type can be formulated to have enough pressure sensitive adhesion (PSA) to work like the SBR rubbers that are used on PSA tape. Unlike the PSA qualities of uncured sulfur rubber, TPU does not have adequate PSA tack to permit PSA assembly. Instead, embodiments of the present invention use either or both of two methods to produce assembly tack, namely the use of tackified cements and the and use of hot rollers (such as are shown in FIGS. 3A-3D) or hot press tools to raise the TPU temperature locally just enough to impart to the TPU PSA qualities and adequate tack to hold the associated tire elements in position during handling, and to permit the assembly to be completed and bonded at high pressure and with cold clamping at a later stage in the manufacture.

Figure 3E:
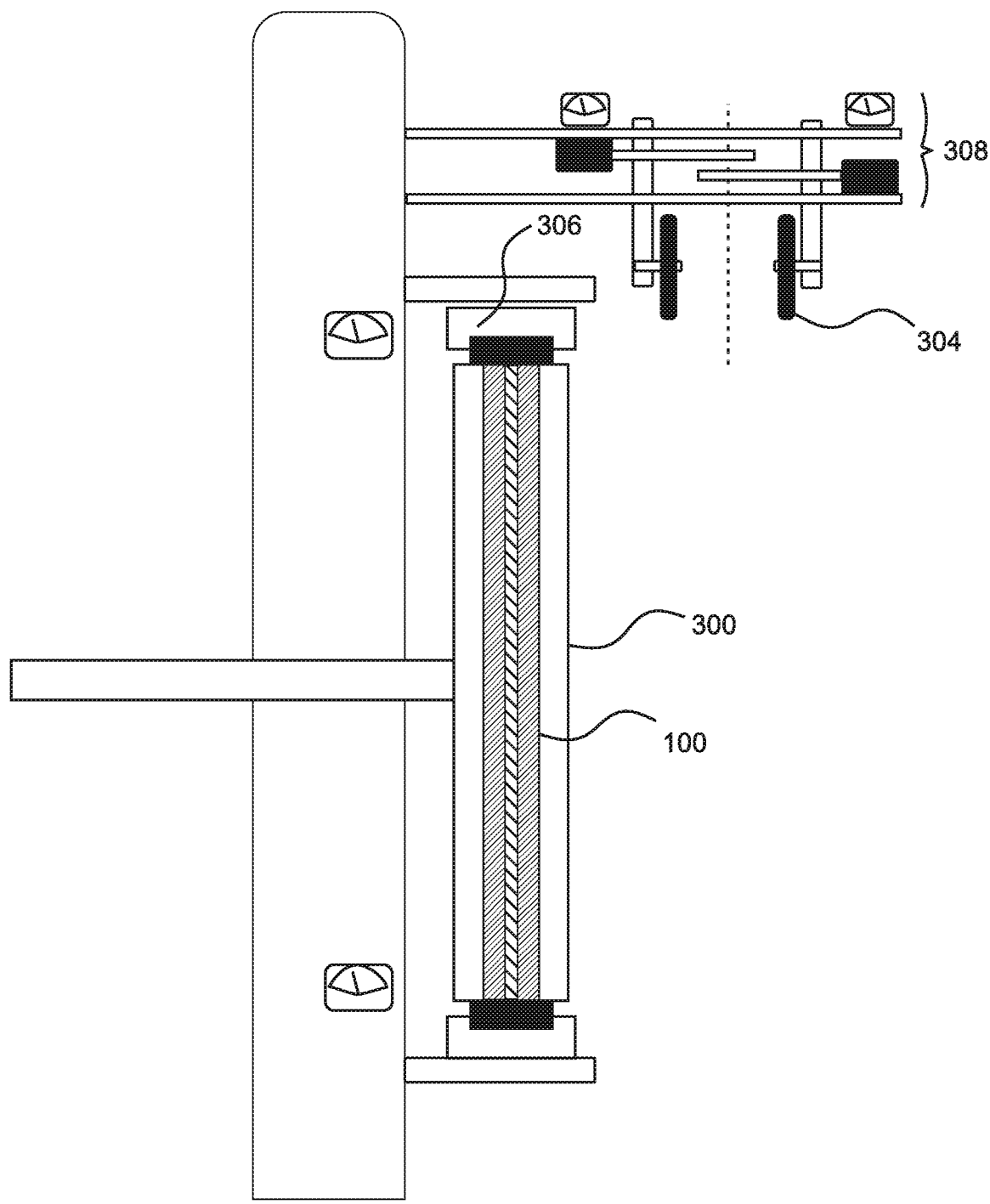
FIG. 3E is a side view of the apparatus of FIG. 3D, showing the forming drum shifted laterally so that a cooling wheel can apply pressure to the carcass while cooling the TPU bonds to below their glass transition temperature.

With reference to FIG. 3E, after the sides 310 of the carcass textile 100 have been folded over and sealed, the heating roller assembly 308 is raised, and the drum 300 is moved laterally so that the cooling ring 306 can be applied to the carcass textile. The cooling ring 306 continues to apply pressure to the carcass textile while cooling it below the glass transition temperature of the applied TPU 102. This prevents "spring back" of the assembly until the TPU is competent to hold the assembly components in place.

Heat Seal Process Conditions:

The required maximum temperature for the heat seal is dependent upon the melting temperature of the TPU elastomer used in the topcoat and mid-coat layers. The ability of the elastomer to flow is also based on the glass transition temperature of the elastomer. On the other hand, the maximum temperature is limited by the fibers that are used in the system. Nylon has a maximum exposure temperature of 430° F. and PET fiber can be exposed to temperatures up to 475° F. Yarns such as para-aramid and liquid crystal PET can be exposed to temperatures up to 575° F. The creep resistance of the heat seal bonds does not need to exceed 130° F. for most small vehicle tires. For tires of this class, the bond temperatures for the TPU are typically between 350° F. and 390° F. The pressures required to achieve the necessarily dense, void-reduced seal is dependent on the surface configurations of the textiles in the bonding pair. The smoother and more void-free the surfaces are, the lower the required bond pressure. In embodiments, a pressure of 50 psi is a minimum, and pressures up to 250 psi can continue to improve the heat seal density.

The process for cooling the heat seal is also important. In embodiments the seal is brought down below the glass transition temperature while under pressure so as to prevent spring-back of the textile before the elastomer has become sufficiently adhesive to control the position of the fiber.

Tread Materials

In conventional tires the solution and styrene butadiene rubber (SSBR) tread compounds and/or hybrid silica/SSBR compounds (referred to herein generically as SSBR tread materials) are highly developed materials with wet and dry braking, low rolling resistance, and good durability. Embodiments of the present invention makes use of these SSBR tread materials and use a novel method to create a low mass complex from these materials that can be TPU heat-sealed to the urethane carcass.

Other materials that are used for tread assemblies and portions of tread assemblies in embodiments of the invention include:

TPU and SSBR tread assemblies;

cast urethane thermoset treads;

combinations of TPU and thermoset polyurethane to form a complexed tread; and thermo-Plastic Vulcanate (TPV) materials that include SSBR vulcanates together with TPU and PU matrix materials.

According to embodiments of the invention, an SSBR tread band is cured in a mold in much the same way that a conventional tire is cured. The cured tread band is then scoured to remove residual oils and mold release. High pressure water can also be used, in combination with a low pH bath and surfactants to remove these residues. The SSBR tread band is then mounted inside-out on a complexing drum, with the tread surface adjacent to the drum. The bonding face is ground on the complexing drum with 220-50 grit abrasive, thereby creating a clean rough surface. After the grinding, the bonding face is coated with less than 30 g/m2 of toluene and polymeric isocyanate and/or other elastomeric cement formulations, which are allowed to flash off, and a bonding TPU film tape is wrapped around the SSBR tread band at a mass of 40 g/m2 and tacked to the tread band using hot rolls or a hot bladder pre-bonding assembly.

The SSBR tread band TPU complex is then removed from the complexing drum, mounted onto the conformed carcass, and moved into a heat seal ring where the required heat and pressure are applied for bonding, as described below with reference to FIGS. 4A through 4E. In similar embodiments, the required heat and pressure are applied sequentially to flattened segments of the tire assembly at the bead radius, as discussed below with reference to FIGS. 6A through 7F. During this tread bonding cycle, careful attention must be paid to the carcass splice, which is reheated during this process. In particular, the carcass splice cannot be subjected to tensile forces while the tread bond is being formed, and the applied forces and expansion of the tire assembly must be controlled to limit expansion of the carcass.

After the TPU has been heated and has flowed, the assembly is cooled under pressure until the temperature has fallen below the glass transition temperature of the TPU, and then the tire is removed from the final assembly building drum or heat sealing unit.

In some embodiments the chemistry of the splice joint is formulated to provide a higher melt temperature than the tread bond TPU, so that the splice remains bonded and moderately resistant to tension during the tread bonding process. The inclusion of low molecular weight polyols and/or blocked isocyanate in the splice TPU can increase the crosslink density of the TPU bond after the bond in the splice is formed. In these embodiments, the isocyanate unblocks during the splice bonding step and reacts with the polyurethane and other materials to increase the crosslink density and adhesion. This temperature enhanced method can also be applied to other joints in the tire such as the turn-up In some embodiments, block isocyanate and/or available functionality in the soft segment of the urethane is used in some or all of the heat seal steps. The isocyanate can be caprolactam blocked, or some other thermally blocked isocyanate formulation can be used. In some of these embodiments, the cement or the TPU/PU materials used in these steps include a blocked-isocyanate, whereby the unblocking temperature is designed to coincide with the heat seal temperature. The advantage of adding a blocked, crosslinking/adhesion promoting formulation (referred to herein as a blocked "isocyanate" formulation) to the TPU is that a TPU can be selected that initially flows well at lower temperatures and pressures, but then, as the isocyanate additive unblocks and causes the TPU material to crosslink, the thermoplastic character of the TPU is reduced and the increased crosslink density of the reacted TPU layer improves the creep resistance of the bond.

Process and Apparatus for Bonding a Tread Layer to the Carcass

Figure 4A:
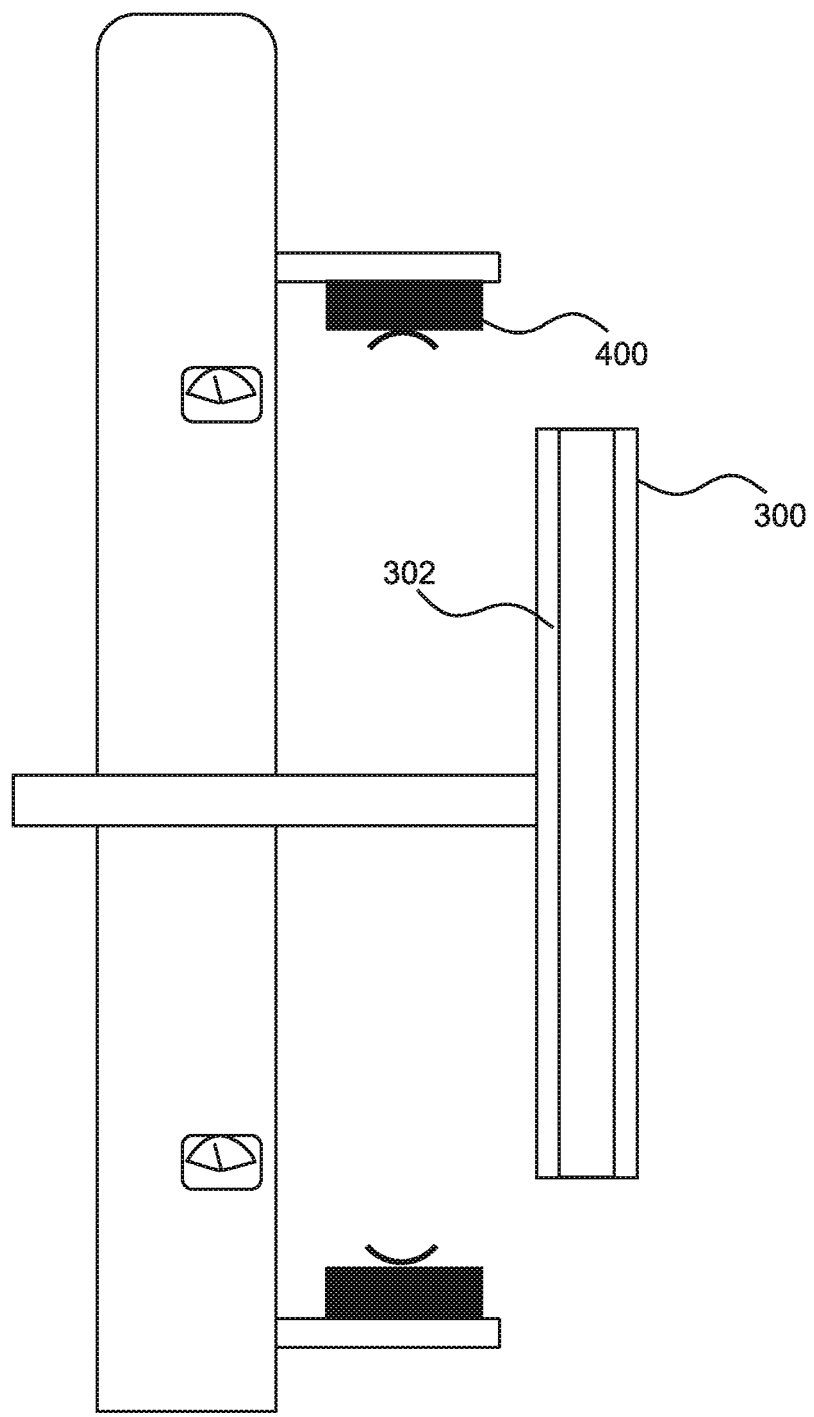
FIG. 4A is a side view of a tire summit building machine used to build a tire assembly on a conformed carcass in an embodiment of the present invention, showing a summit building drum with heat seal ring and controllers.
Figure 4B:
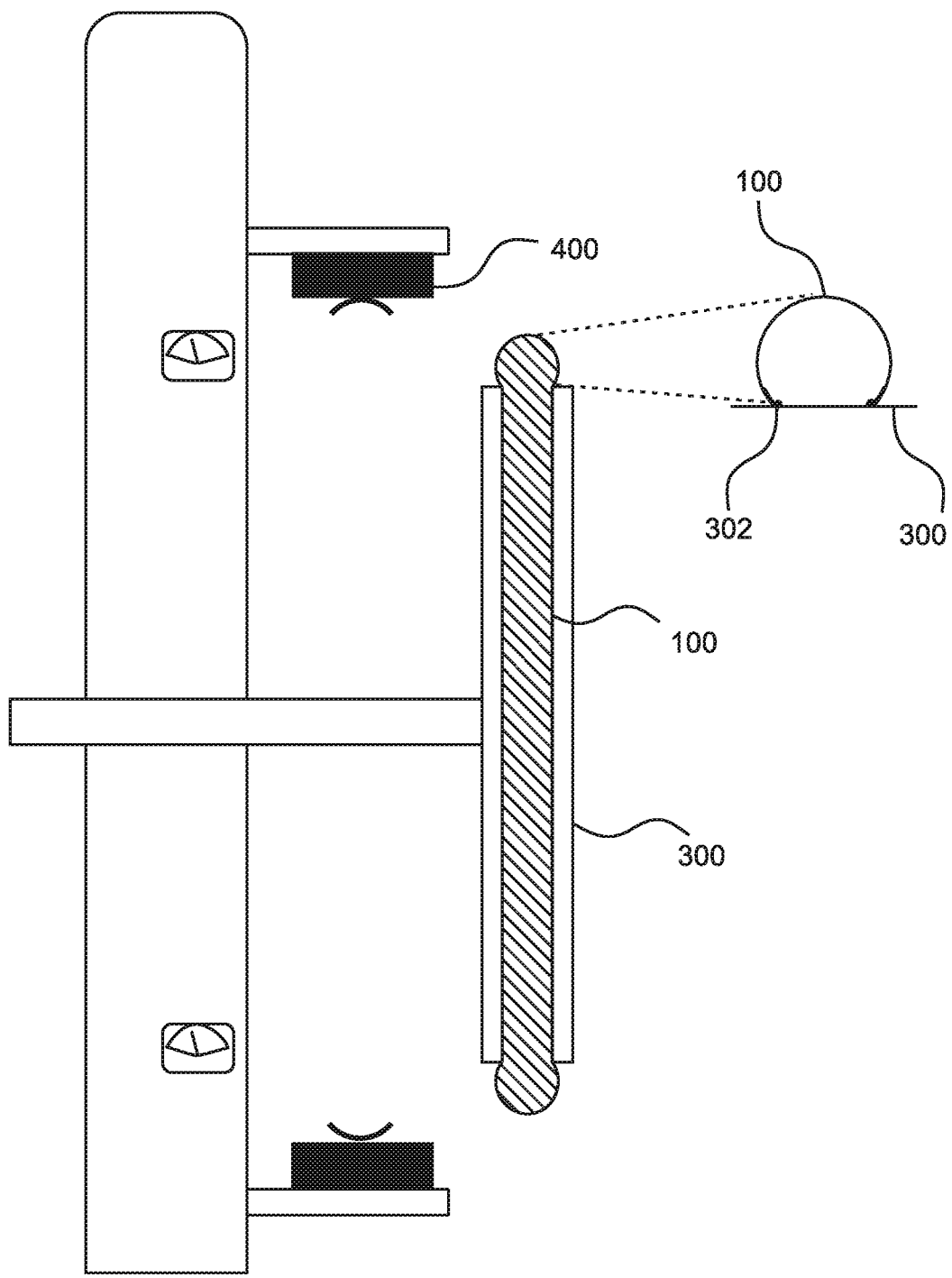
FIG. 4B is a side view of the building machine of FIG. 4A showing the building drum and heat seal ring, with the carcass loaded, conformed on the drum and supported by an underlying, inflated bladder for summit assembly.

FIG. 4A is a side view of a tire summit building machine that is configured for forming a TPU bond between a tread layer 406 and a carcass 100, and optionally also between a breaker layer 404 and the carcass 100, while the tire assembly is conformed and supported by an underlying bladder. For simplicity of illustration, the cooling ring 306 and roller assembly 308 of FIGS. 3A-3E are omitted from FIGS. 4A-4E. However, it will be understood that embodiments of the disclosed apparatus include all of these features. Embodiments of the completed tire assembly in various embodiments are shown in FIGS. 5A and 5B.

The apparatus of FIG. 4A is configured for assembly of tires having hybrid silicon/SSBR TPU treads as described above. It includes a building drum 300 and a heat seal ring 400. FIG. 4B is a side view of the apparatus of FIG. 4A, showing the carcass 100 of FIG. 3E mounted on the drum 300 and conformed for summit assembly over a supporting, inflated bladder.

In the embodiment of FIGS. 4A-4E, the drum 300 is able to expand and contract laterally/axially as well as radially. In FIGS. 4B-4E, the drum has been contracted axially, bringing the grooves 302 and the bead cores 506 of the carcass 100 closer together, so that the carcass 100 has been "conformed" to assume an upwardly curved shape, as shown in the figures. A cross section of a top segment of the carcass 100 is shown in each of FIGS. 4B-4E in an enlargement to the right of the drum 300, where it can be seen that the walls of the carcass in its conformed configuration bow outward from the bead cores 506.

Figure 4C:
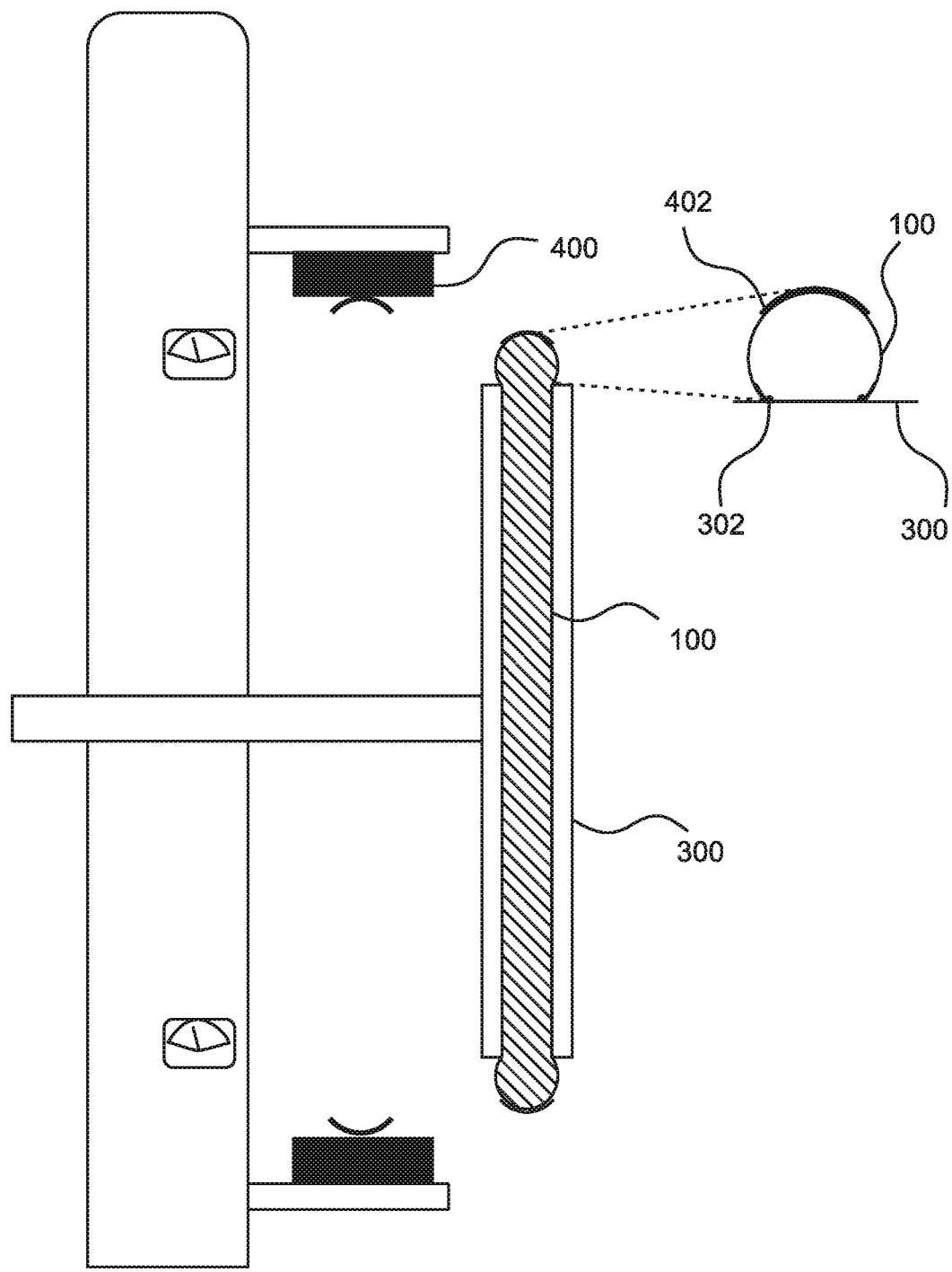
FIG. 4C is a side view of the building machine of FIG. 4B showing a breaker fabric or summit chafer fabric applied to the carcass.
Figure 5A:
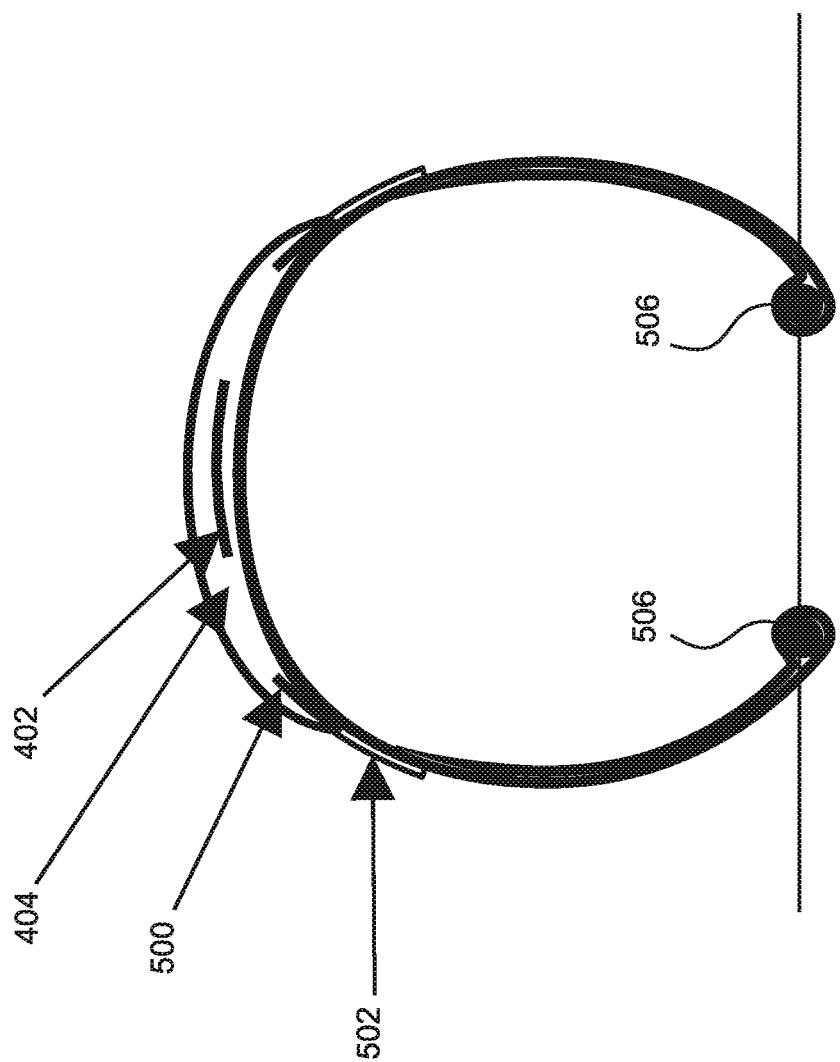
FIG. 5A is a cross-sectional view of a tire assembly in an embodiment that includes an SSBR tread layer and a tread chaffer layer.
Figure 5B:
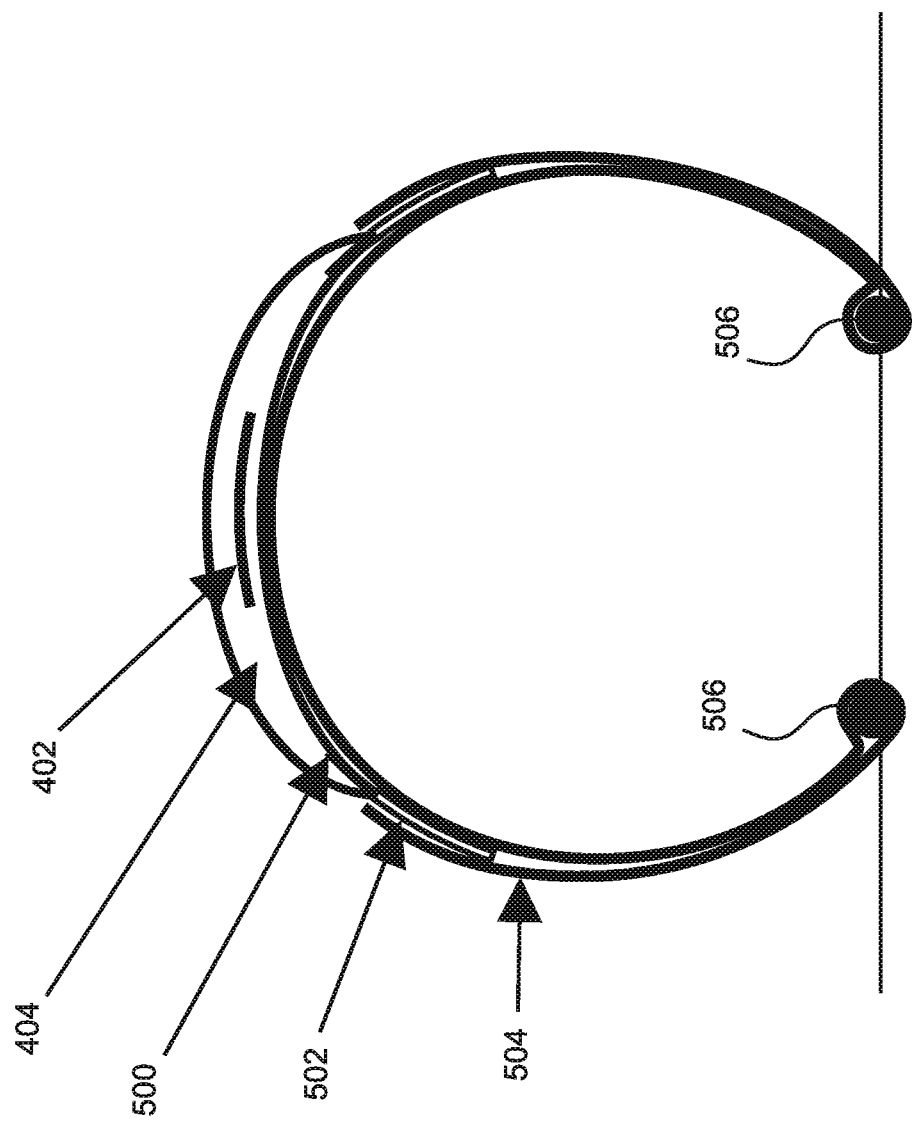
FIG. 5B is a cross-sectional view of an embodiment similar to FIG. 5A, except that it has a high carcass turn-up which overlaps the tread band chaffer at the edge of the tread.

FIG. 4C is a side view of the building machine of FIG. 4B, showing a breaker fabric 402 applied to the carcass 100. In similar embodiments, a summit chafer fabric is applied in lieu of the breaker fabric 402, and in still other embodiments both a breaker fabric 402 and a summit chafer fabric are applied.

Figure 4D:
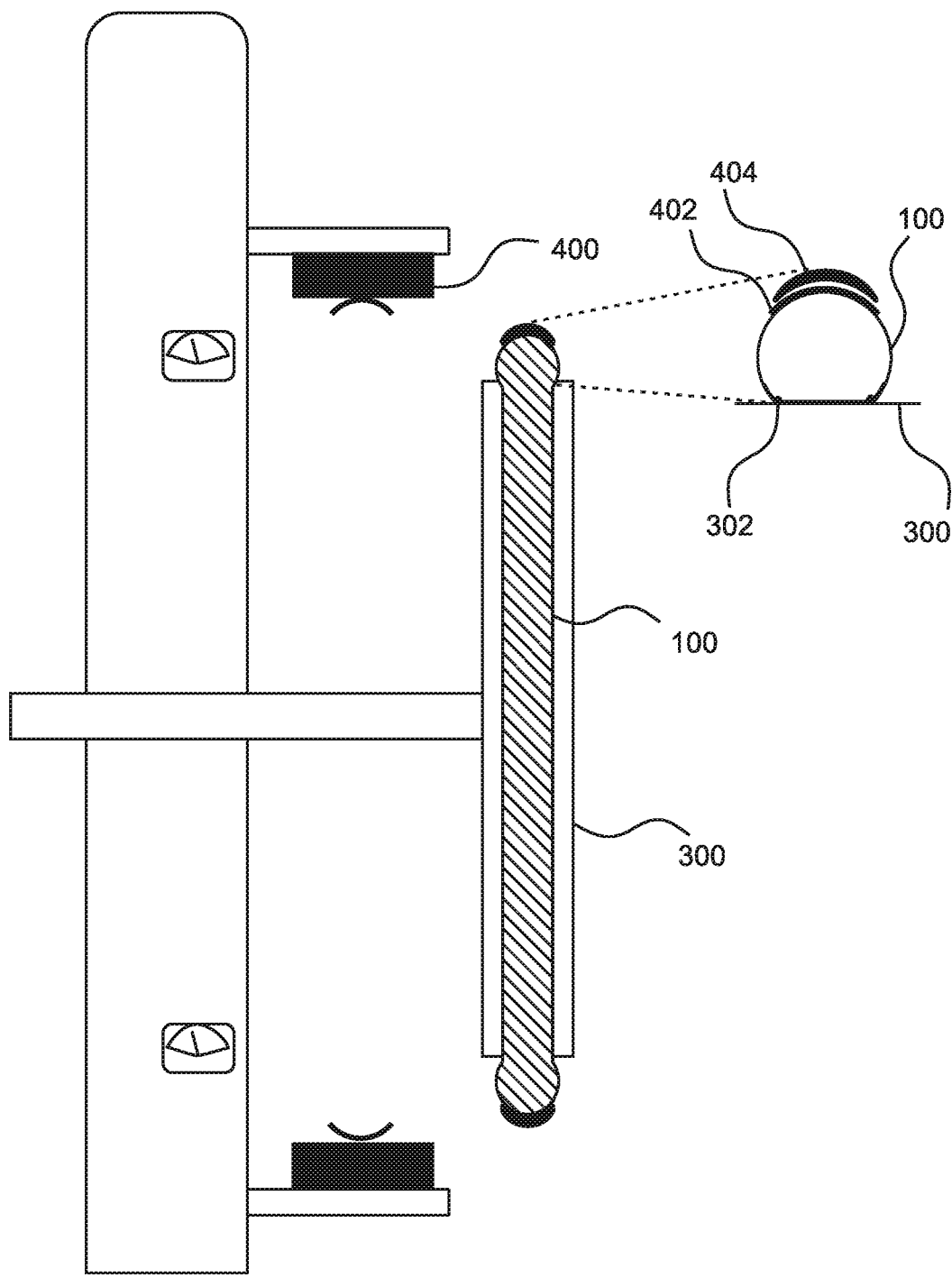
FIG. 4D is a side view of the building machine of FIG. 4C, showing a tread layer applied on top of the breaker and carcass.
Figure 4E:
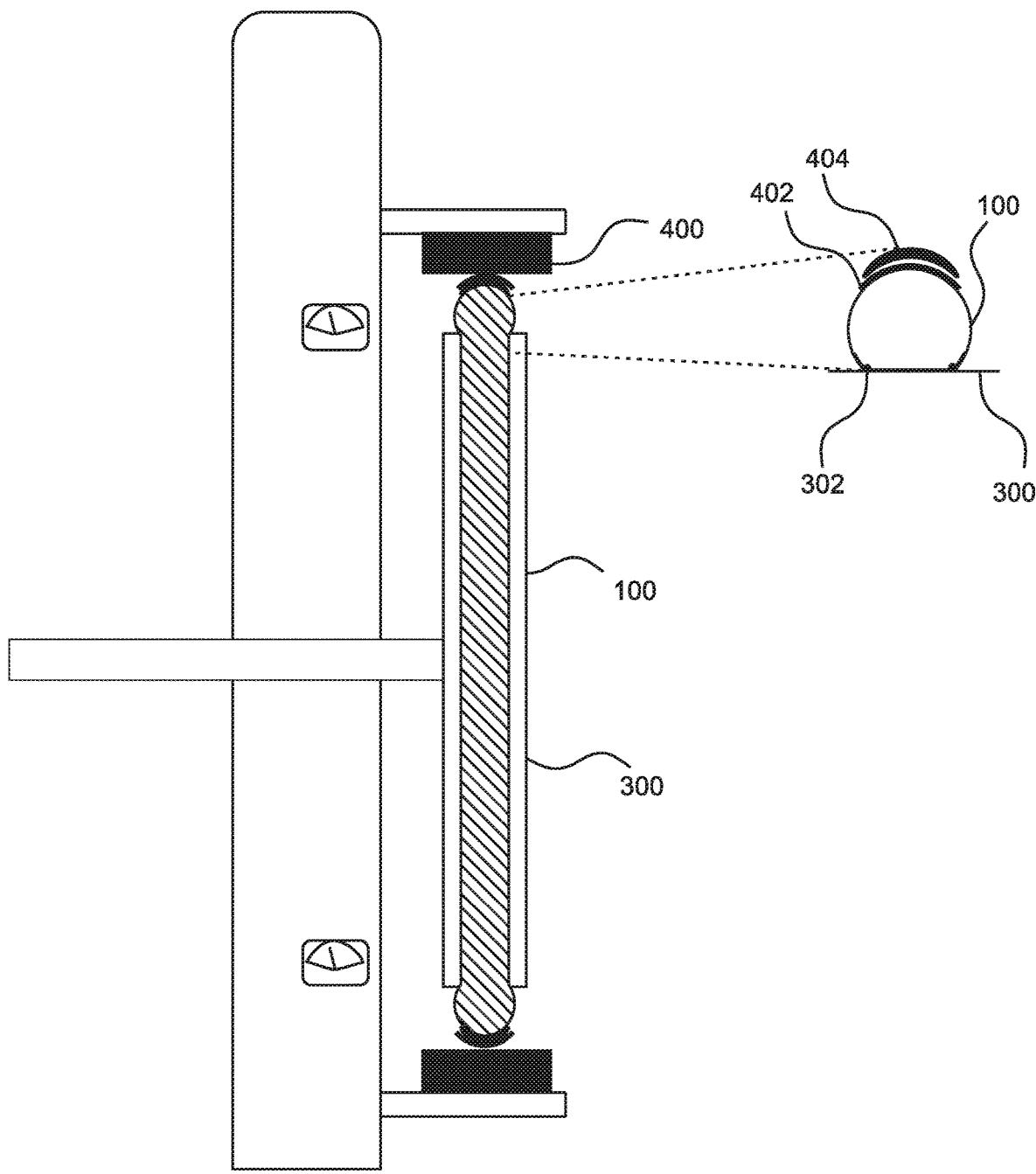
FIG. 4E is a side view of the building machine of FIG. 4C, showing the tire assembly moved axially beneath a heat sealing ring for bonding of the applied breaker and tread layers to the carcass.

In FIG. 4D, a silicon/SSBR TPU tread layer 404 has been applied onto the breaker 402 and carcass 100. FIG. 4E is a side view of the building machine of FIG. 4D showing the tire moved inward beneath the heat seal ring 400, which can apply heat and pressure so as to form a TPU bond between the breaker 402, the tread band 404, and the carcass 100.

With reference to FIG. 5A, the attachment of the edges of the tread complex 404 to the carcass 100 is critical to tire durability. An embodiment to improve durability uses additional sulfur cure bonding paired with urethane bonding methods. In this family of embodiments the tread band 404 is a sulfur cured elastomer that is molded with the following textile components:

- puncture and cut resistant breaker textiles, cord and full woven type 402;
- full width chaffer or cord fabrics extending under the complete tread band and extending beyond the tread band 404; and
- shoulder tapes bonded into the edge of the tread band and extending to the TPU coated carcass 502.

In the embodiment of FIG. 5A, these textile components are used to optimize the dual requirements of sulfur cure and heat seal TPU elastomer bonding. In the region of the shoulder tape 502 that is under the tread band 404, the two faces of the shoulder tape textile 502 are optimized for bonding to the dual system. The upper surface is primed and treated with Resorcinol Formaldehyde Latex (RFL) for sulfur cure bonding. The face of the carcass 100 is primed and coated with TPU and isocyanate and/or blocked isocyanate for optimal TPU bonding. This is done in two steps, whereby the sulfur cure bonds are formed first when the tread band 404 is molded, and then the TPU bonds are created after the tread band 404 is molded.

The region of the tread wing chaffer textile 500 that is under the tread 404 has the same two-sided characteristic. However, the portion of the chaffer textile 502 that is not under the tread 404 is configured for TPU bonding on both sides to the carcass 100. This provides a very strong, smooth edge seal for the integration of the tread band 404 with the carcass 100.

With reference to FIG. 5B, other embodiments of this family of embodiments include a high carcass turn-up 504 which overlaps the tread band shoulder tape 502 at the edge of the tread layer 404. The overlap zone is TPU heat seal bonded with the portion of the chaffer textile 500 that is not under the tread layer 404, while the portion of the chafer textile 500 that is under the tread layer 404 is sulfur bonded.

Figure 5C:
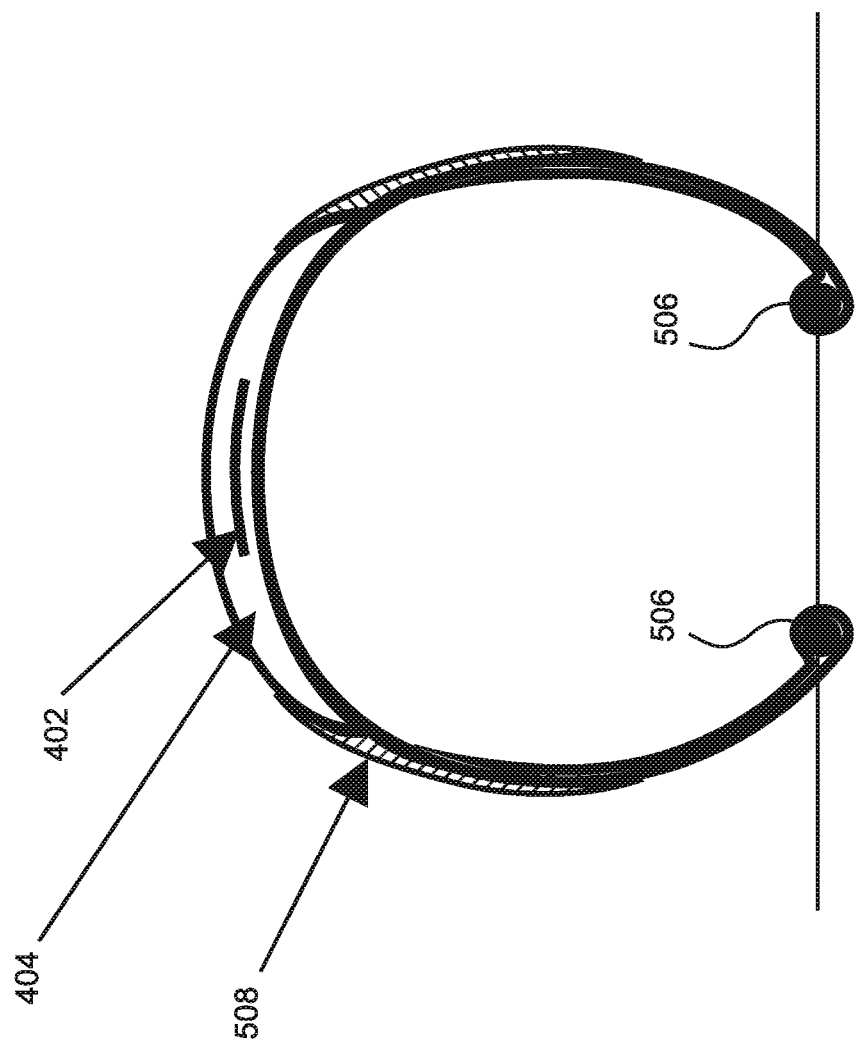
FIG. 5C is a cross-sectional view of an embodiment that includes a chafer layer of TPU that enhances and protects the attachment of the edges of the tread complex to the carcass.

With reference to FIG. 5C, embodiments include a "chafer" layer of TPU 508 that enhances and protects the attachment of the edges of the tread complex 404 to the carcass. In embodiments, this chafer TPU layer can be approximately 8 mils thick and 200 mils wide.

Successful bonding of urethane tire components requires at least 3 primary factors:

1) Application of sufficient pressure to produce a low void textile and TPU structure;
2) Heating of the TPU to a temperature that is high enough above its glass transition temperature to reduce the TPU viscosity sufficiently to allow it to flow into the void spaces of the textiles; and
3) Maintenance of applied pressure during cooling of the TPU below its glass transition temperature, so as to maintain the physical configuration of the assembly that was created during the pressing and heating steps.

Embodiments of the present invention require that TPU bonds be formed during at least two separate bonding cycles. During the first of these bonding cycles, the sides of the carcass textile that have been folded over the bead cores are TPU bonded with the underlying carcass textile. During the second of these bonding cycles, the tread, and if included the breaker, chafer fabric, and/or shoulder tape, is/are bonded to the folded carcass.

Assembly Process Methods

Embodiments of the method disclosed herein of making a lightweight, heat sealed tire include some or all of the following steps:
   carcass textile scouring, priming and coating;
   cutting of a strip of the carcass textile;
   forming of the strip of carcass textile into a carcass textile band by forming a splice bond, which in embodiments is a biased seam;
   application of the bead cores to the carcass textile;
   folding or "turn-up" of the sides of the carcass textile over the bead cores (with cement adhesive used in some embodiments to hold the folded sides in place);
   turn-up pre-bonding, in some embodiments by tacking, or by hot roll down (as shown for example in FIGS. 3A through 3E);
   tread assembly (with cement adhesives, shoulder tapes and breakers in some embodiments);
   tread molding, curing, and/or pre-bonding, in some embodiments by tacking, hot roll down, and/or bladder ring, so as to mold and/or cure the tread if needed, and/or pre-bond the tread with the breaker, chafer textile, and/or shoulder tape; and
   final bonding of the tread to the carcass
      in a flat configuration; or
      in a conformed configuration whereby the carcass is conformed into an upwardly curved configuration by bringing the bead cores closer together to approximately their final, operational spacing.

Pre-Bond Process

The pre-bonding steps listed above are accomplished in embodiments by various means, including TPU bonding or "tacking" by hot rollers and bonding by cements. The objective in each case is to create an assembly with sufficient structural integrity to permit a final, full bond operation. In the final bond step the equipment is configured to provide heating and pressure that is sufficient to provide a fully bonded tire with the required strength and durability. In various embodiments, the pressure applied during this final bonding is between 50 and 300 psi.

In addition to providing mechanical support and the required bonding pressures, the tire-building apparatus of the present invention must also be able to provide sufficient heating to the tire elements. The required bonding temperatures are dependent on the TPU formulations that are used. Generally, TPU formulations having higher glass transition temperatures (Tg's) are preferred over TPU formulations that soften at lower temperatures, because higher Tg TPU formulations will provide better performance when the tire is exposed to hot road surfaces and to heating associated with breaking frictions.

For these higher tg TPU formulations, it is typically necessary to raise the temperature to between 350 and 375 degrees Fahrenheit so as to allow the TPU to flow into the textiles. It is then necessary to maintain an applied pressure to the TPU, and especially to the TPU bond line, while the TPU is cooled to a temperature between 200 and 250 degrees Fahrenheit.

Segmental Bar Bonding

In the embodiment of FIGS. 4A through 4E, the space between the grooves 302 and thus between the bead cores 614 is reduced as compared to FIGS. 3A through 3E, so that the carcass 100 is conformed into an upwardly curved shape. During the illustrated bonding process, a bladder is inflated beneath the conformed carcass 100 and pressurized by steam or oil to provide both the pressure and the heat that are required for the TPU bonding process.

In other embodiments, the carcass turn-up and/or tread assembly is/are bonded to the carcass in a "flat bar" bonder, wherein heat and pressure are applied to the tire assembly while it is in a flattened configuration, rather than a conformed configuration. In some of these embodiments, rather than heating and cooling the tire assembly all at once, heating and cooling are applied sequentially to flattened segments or arcs of the tire, as shown in the cross sectional front views of FIGS. 6A through 6C. In the embodiment shown in FIGS. 6A through 6C, the tire is placed upon and suspended from a bond head 600, which includes an opposing pair of heating elements 602, 610 adjacent to an opposing pair of cooling elements 604, 608, all of which are applied simultaneously to the upper and lower flattened surfaces of adjacent segments of the tire assembly 606.

In FIG. 6A, the tire assembly 606 has been positioned such that an un-bonded segment is located between the upper 602 and lower 610 heating elements of the bond head 600, while a previously heated segment 608 is positioned between the upper 604 and lower 608 cooling elements of the bond head 600. In FIG. 6B, both the heating elements 602, 610 and the cooling elements 604, 608 of the bond head 600 have been applied to the tire assembly 606 simultaneously, after which, as shown in FIG. 6C, the upper elements 602, 604 of the bond head 600 have been withdrawn, and the tire assembly 606 has been manually rotated so that the cooled and bonded segment 614 is no longer under the bond head 600, the freshly heated segment is positioned between the cooling elements 604, 608 and an un-bonded segment 612 has been positioned between the heating elements 602, 610. These three steps are then repeated until all segments of the tire assembly 606 have been bonded. In the illustrated embodiment, the tire assembly 606 is divided into six adjacent segments, as illustrated by the dashed lines in FIG. 6C, and is rotated seven times during the bonding process so as to sequentially heat and cool all six of the segments.

Note that both the heating 602, 610 and cooling 604, 608 elements of the bond head 600 apply pressure to the tire assembly 600 when they are applied, so that the pressure is maintained both while the TPU materials are heated and while they are cooled. In embodiments, the manual rotation of the tire assembly 606 and reapplication of the bond head 600 are enacted rapidly, so as apply pressure almost continuously during each entire heating and cooling cycle.

In some embodiments, the ends of the heating elements 602, 610 of the bond head 600 are cooled so as to prevent inadvertent application of heat to any portion of the tire assembly 606 that is not under pressure. In certain embodiments, the bond head 600 has only a single pair of elements, which are cycled in temperature while pressure is applied to each segment of the tire assembly 606.

FIGS. 6D and 6E present side-by-side front cross section and side views of the embodiment of FIGS. 6A-6C. FIG. 6F is an enlarged cross section taken at the location indicated in FIG. 6E. The cross section of FIG. 6F shows the tread assembly 404 and carcass 100 sandwiched between the upper 602 and lower 610 heating elements of the bond head 600. It can be seen in FIG. 6F that the width of the bond head 600 is greater than the width of the carcass 100 at the beads 614. In FIG. 6F, a curved portion is provided within the upper heating elements 602 that matches a curvature of the tread assembly 404. In various other embodiments, the shape of the upper heating elements 602 from bead to bead 614 can be anything from fully flat to a fully circular profile.

In the embodiment of FIG. 6F, the grooves 302 and bead cores 614 are spaced apart such that the carcass 100 is flat beneath the tread assembly 404. The tread assembly 404 is thereby bonded to the carcass 100 at the "bead diameter" rather than bonding the tread at the larger tread diameter as illustrated in FIGS. 4A through 4E. It can also be seen that the bond beads, i.e. the regions on both sides of the carcass 100 where the sides 310 of the carcass textile 100 are folded over the bead cores 506, are both heated by the heating elements 602, 610 and subsequently both cooled by the cooling elements 604, 608.

Figure 7A:
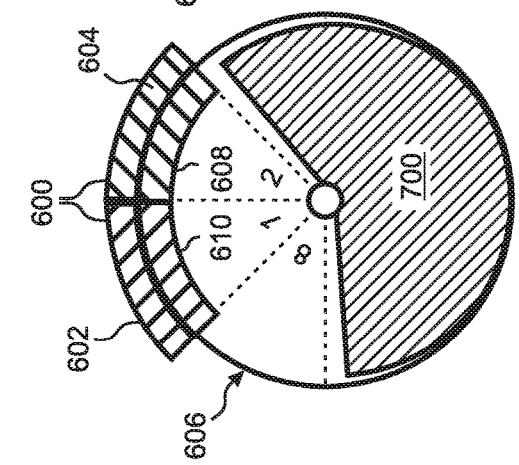
FIGS. 7A through 7F are side views of an embodiment similar to FIGS. 6A through 6D, wherein the operation of an automatic rotational actuator on the tire assembly is indicated.
Figure 7B:
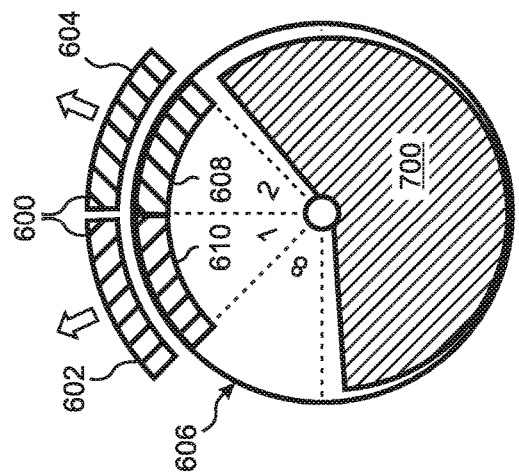
Figure 7C:
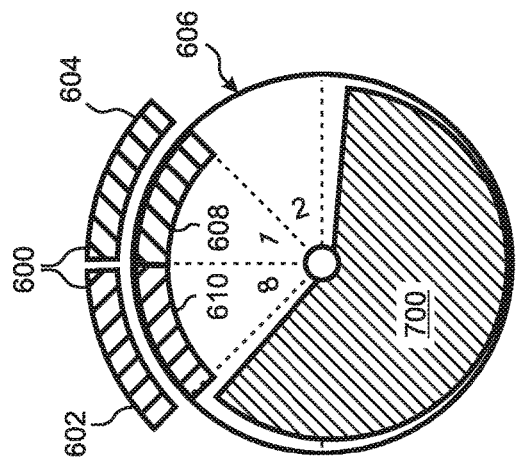
Figure 7D:
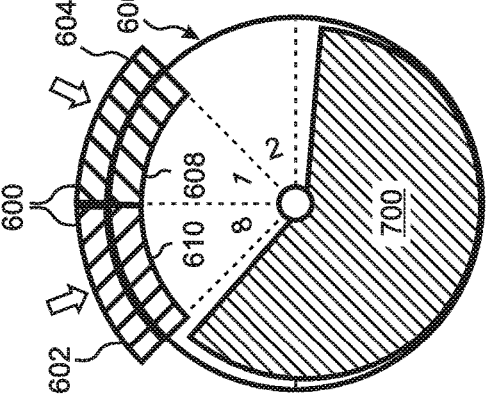
Figure 7E:
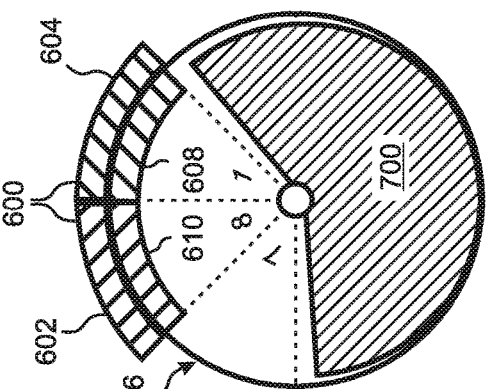
Figure 7F:
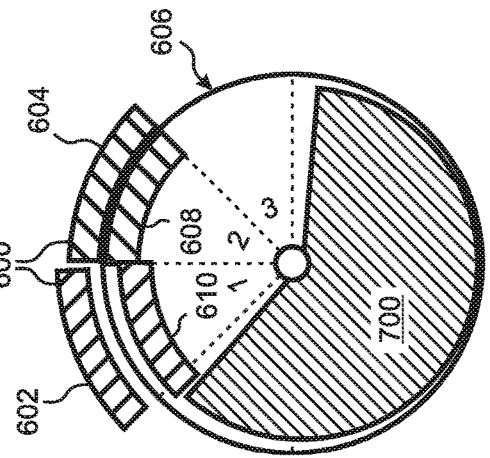

In the sequence of bonding steps described above in reference to FIGS. 6A through 6F, the tire assembly 606 is manually rotated between applications of heating/cooling and pressure by the bond head 600. A similar embodiment is illustrated in FIGS. 7A-7F, wherein the mechanism further includes a rotational actuator 700 that automatically rotates the tire assembly 606. In FIG. 7A, the heating 602, 610 and cooling 604, 608 elements of the bond head 600 are applied to the tire assembly 606. In FIG. 7B the upper heating 602 and cooling 604 elements are disengaged from the tire assembly 606 and in FIG. 7C the rotational actuator 700 engages with the tire assembly 606 and rotates the tire assembly 606 clockwise by one segment. In FIG. 7D, the upper heating 602 and cooling 604 elements are re-applied to the rotated tire assembly 606, and in FIG. 7E the rotational actuator 700 is disengaged from the tire assembly 606 and returned to its original position, in preparation for the next rotation. These steps are repeated until the final segment arrives between the upper 604 and lower 608 cooling elements, as shown in FIG. 7F. In the illustrated embodiment, at this last step only the cooling elements 604, 608 are applied to the tire assembly 606, while both the upper 602 and lower 610 heating elements are withdrawn from the tire assembly 606, so that the segment that is between the heating elements 602, 610, which has already been bonded, is not re-heated.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application.

This specification is not intended to be exhaustive. Although the present application is shown in a limited number of forms, the scope of the invention is not limited to just these forms, but is amenable to various changes and modifications without departing from the spirit thereof. One or ordinary skill in the art should appreciate after learning the teachings related to the claimed subject matter contained in the foregoing description that many modifications and variations are possible in light of this disclosure. Accordingly, the claimed subject matter includes any combination of the above-described elements in all possible variations thereof, unless otherwise indicated herein or otherwise clearly contradicted by context. In particular, the limitations presented in dependent claims below can be combined with their corresponding independent claims in any number and in any order without departing from the scope of this disclosure, unless the dependent claims are logically incompatible with each other.

I claim:

1. A vehicle tire, comprising:
a textile carcass assembly comprising:
a circular band of carcass textile having at least one set of primary yarns;
at least one priming layer applied to and directly contacting the primary yarns of the carcass textile, said at least one priming layer comprising at least one of an isocyanate, an epoxy, a resorcinol formaldehyde latex, and a polyol;
a first layer of thermoplastic applied to left and right sides of the carcass textile in direct contact with the at least one priming layer; and
left and right circular cords applied as bead cores to the carcass textile proximal to left and right edges thereof, the left and right sides of the carcass textile being folded over the bead cores; and
a tread layer applied to the textile carcass assembly;
the at least one priming layer and the first layer of thermoplastic are free of sulfur cured elastomer;
wherein the left and right sides of the carcass textile are folded onto an outer surface of the carcass textile, thereby forming at least portions of exterior sidewall surfaces of the tire.

2. The tire of claim 1, wherein the carcass textile includes a yarn woven into the carcass textile that includes at least one of liquid crystal polymer fibers and para aramid fibers.

3. The tire of claim 1, wherein a priming layer of the at least one priming layer has a modulus that is between a modulus of the carcass textile and a modulus of the first layer of thermoplastic.

4. The tire of claim 1, wherein the carcass textile is formed as a carcass textile strip having ends that are joined to each other along a seam line by a textile splicing tape, said textile splicing tape being bonded to said ends of said carcass textile strip by a splicing thermoplastic layer.

5. The tire of claim 4, wherein a tensile strength of the textile splicing tape is asymmetric, being higher in a direction that is perpendicular to the seam line than in a direction that is parallel to the seam line.

6. The tire of claim 1, wherein the carcass textile is formed as a carcass textile strip having ends that are overlapped and joined to each other by a splicing thermoplastic layer.

7. The tire of claim 1, wherein the folded left and right sides of the carcass textile extend at least to a center of the carcass textile.

8. The tire of claim 1, wherein yarns in the folded sides of the carcass textile extend partially between yarns of the underlying regions of the carcass textile.

9. The tire of claim 1, wherein the primary yarns of the carcass textile are formed by yarns that are flattened, such that widths thereof are greater than heights thereof.

10. The tire of claim 1, wherein the carcass textile is an asymmetric weave.

11. The tire of claim 1, wherein the first layer of thermoplastic is transparent or translucent, and the textile carcass assembly further comprises a dyed or printed color, decoration, or other visual indication applied to a visible surface of the carcass textile.

12. The tire of claim 1, wherein the first layer of thermoplastic includes a dye or other coloring agent added thereto so as to determine a visible color of the visible surfaces of the carcass.

13. The tire of claim 1, wherein a visible surface of the first layer of thermoplastic is embossed.

14. The tire of claim 1, wherein the first layer of thermoplastic applied to the left and right sides of the carcass textile includes an elastomeric matrix of thermoplastic containing a ceramic grain.

15. The tire of claim 1, wherein the first layer of thermoplastic extends over a full upper surface of the carcass textile, and a breaker layer is adhered to a central region of the carcass textile by the first layer of thermoplastic.

16. The tire of claim 15, further comprising a second priming layer applied between the first layer of thermoplastic and the breaker layer, the second priming layer having a modulus that is between a modulus of the first layer of thermoplastic and a modulus of the breaker layer.

17. The tire of claim 15, wherein the breaker layer includes at least one of liquid crystal polymer fibers and para aramid fibers.

18. The tire of claim 1, wherein the tread layer includes a sulfur-cured elastomer containing at least 10% carbon black or silica by weight.

19. The tire of claim 1, wherein the tread layer includes at least one of polyurethane, thermoplastic vulcanizate (TPV), solution styrene butadiene rubber (SBBR), and hybrid silicon/SBBR.

20. The tire of claim 1, wherein the tread layer is molded before application thereof to the textile carcass assembly.

21. The tire of claim 20 wherein the tread layer includes a breaker textile embedded therein.

22. The tire of claim 1, further comprising a chafer textile layer comprising a TPU layer that is bonded to the textile carcass assembly and extends over areas of the textile carcass assembly that are not beneath the tread layer.

* * * * *